US011496790B2

(12) United States Patent
Matsimanis et al.

(10) Patent No.: US 11,496,790 B2
(45) Date of Patent: Nov. 8, 2022

(54) ULTRA-WIDEBAND CONTROL OF SMART STREAMING DEVICES

(71) Applicant: Meta Platforms Technologies, LLC, Menlo Park, CA (US)

(72) Inventors: Peter Andrew Matsimanis, Menlo Park, CA (US); Igor Gurovski, Lund (SE); Pascal Bentioulis, Lund (SE); Turan Caliskan, Menlo Park, CA (US); Per Kristiansson, Menlo Park, CA (US); Per-Erik Bergstrom, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/178,226

(22) Filed: Feb. 17, 2021

(65) Prior Publication Data

US 2022/0264172 A1    Aug. 18, 2022

(51) Int. Cl.
*G06F 3/00* (2006.01)
*G06F 13/00* (2006.01)
(Continued)

(52) U.S. Cl.
CPC ... *H04N 21/42222* (2013.01); *H04N 21/4223* (2013.01); *H04N 21/42201* (2013.01);
(Continued)

(58) Field of Classification Search
CPC ....... H04N 21/42222; H04N 21/42201; H04N 21/42202; H04N 21/42218; H04N 21/4223; H04N 21/4532
See application file for complete search history.

(56) References Cited

U.S. PATENT DOCUMENTS 8,295,769 B2    10/2012  Bloebaum
2007/0293190 A1 *  12/2007  Ota ................. G08C 17/00
                                                        455/404.2
(Continued)

FOREIGN PATENT DOCUMENTS

EP    3916620 A1 *  12/2021    ......... G06K 9/00228

OTHER PUBLICATIONS

International Search Report and Written Opinion for International Application No. PCT/US2022/016640 dated May 16, 2022, 10 pages.
(Continued)

*Primary Examiner* — Kyu Chae
(74) *Attorney, Agent, or Firm* — Potomac Law Group, PLLC

(57) ABSTRACT

Systems and methods for controlling a smart streaming device are disclosed herein. The smart streaming device is controlled based on a position of an ultra-wideband (UWB) device. Based on the position of the UWB device, one or more service events for the smart streaming device can be conducted. For example, a privacy mode of the smart streaming device can be enabled or disabled based on the position of the UWB device. In another example, a distance can be determined between the smart streaming device and the position of the UWB device. Based on the distance, an output configuration of the smart streaming device can be set, such as dynamically adjusting volume or text size on the smart streaming device.

18 Claims, 15 Drawing Sheets

(51) Int. Cl.
  *H04N 5/445*     (2011.01)
  *H04N 7/16*      (2011.01)
  *H04N 21/422*    (2011.01)
  *H04N 21/4223*   (2011.01)
  *H04N 21/45*     (2011.01)

(52) U.S. Cl.
  CPC . *H04N 21/42202* (2013.01); *H04N 21/42218* (2013.01); *H04N 21/4532* (2013.01)

(56) References Cited

U.S. PATENT DOCUMENTS

| | | |
|---|---|---|
| 2007/0293261 A1 | 12/2007 | Chung |
| 2008/0120673 A1* | 5/2008 | Dong ................ H04N 21/4113 348/E7.071 |
| 2009/0055537 A1 | 2/2009 | Takei et al. |
| 2012/0122431 A1 | 5/2012 | Moon |
| 2014/0273859 A1 | 9/2014 | Luna et al. |
| 2014/0323123 A1 | 10/2014 | Park |
| 2015/0326704 A1* | 11/2015 | Ko .................... H04M 1/72457 455/456.3 |
| 2016/0014324 A1* | 1/2016 | Fan .................... H04N 5/23229 348/207.11 |
| 2018/0074783 A1* | 3/2018 | Jang ........................ G06F 3/165 |
| 2019/0195981 A1* | 6/2019 | Ding ........................ G01S 5/0231 |
| 2019/0281408 A1* | 9/2019 | Zhao ...................... H04W 4/021 |
| 2019/0335249 A1* | 10/2019 | Shimy .............. H04N 21/42201 |
| 2019/0354662 A1* | 11/2019 | Min .............. G01S 13/867 |
| 2020/0106877 A1 | 4/2020 | Ledvina et al. |
| 2020/0304445 A1* | 9/2020 | Dinhthi ................ G06F 3/0481 |
| 2020/0382647 A1 | 12/2020 | Krochmal et al. |
| 2021/0374387 A1* | 12/2021 | Whitelaw ............... G06T 7/194 |

OTHER PUBLICATIONS

Invitation to Pay Additional Fees for International Application No. PCT/US2022/015880, mailed May 12, 2022, 10 pages.
International Search Report and Written Opinion for International Application No. PCT/US2022/015880, dated Jul. 7, 2022, 14 pages.

* cited by examiner

ULTRA-WIDEBAND CONTROL OF SMART STREAMING DEVICES

CROSS-REFERENCE TO RELATED APPLICATION(S)

This application is related to U.S. patent application Ser. No. 17/178,223, filed Feb. 17, 2021, having, titled "ULTRA-WIDEBAND CONTROL OF SMART STREAMING DEVICES," which is hereby incorporated by reference in its entirety.

TECHNICAL FIELD

The present disclosure is directed to the use of ultra-wideband communication technology to control smart streaming devices.

BACKGROUND

Ultra-wideband technology is a low energy level, short-range, high bandwidth radio communication technology. Ultra-wideband technology allows for communications over a large portion of the radio spectrum. An advantage of ultra-wideband technology is that ultra-wideband technology does not interfere with conventional narrowband and carrier wave transmissions in the same frequency band.

Ultra-wideband technology allows systems and devices employing the technology to determine "time of flight" of transmissions at various frequencies, which helps to overcome the problem of multipath propagation, as at least some of the frequencies have a line-of-sight trajectory.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
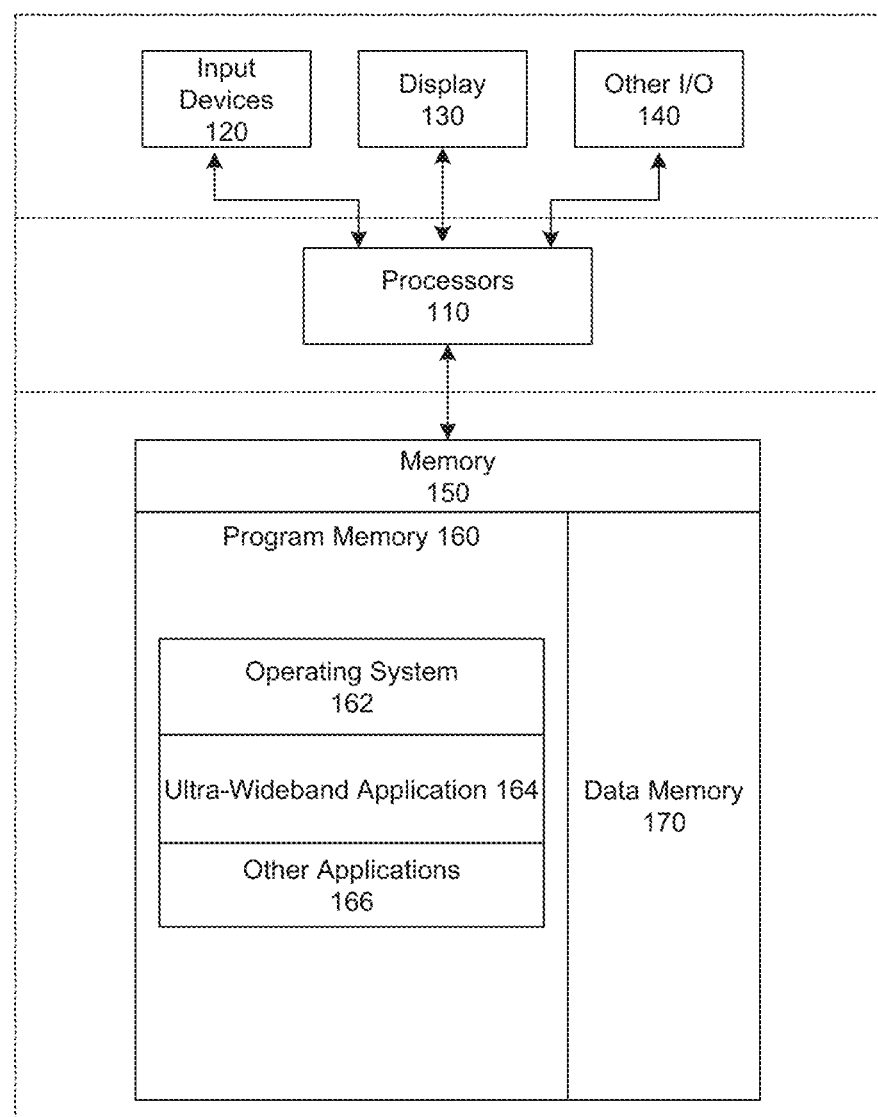
FIG. 1 is a block diagram illustrating an overview of devices on which some implementations can operate.

Aspects of the present disclosure are directed to the use of an ultra-wideband control device for personal computing devices, such as smart display, communication, and streaming devices. Ultra-wideband enabled devices can accurately determine the distance between one sending ultra-wideband enabled device and one receiving ultra-wideband enabled device, as well as determine an angle of arrival of the signal from the sending ultra-wideband device. In addition to determining these values, ultra-wideband enabled devices can also use ultra-wideband as a communication channel for transmitting data to other ultra-wideband enabled devices. The use of ultra-wideband technology allows for a variety of functions to be performed with regards to the control of personal computing devices. Examples of these functions include transferring communication sessions between personal computing devices, automatically controlling settings based on a position of the ultra-wideband control device, transferring data from one personal computing device to another, among others. The use of ultra-wideband technology allows for easier communications between devices without interfering with other communication frequencies and/or devices in the area.

For example, a user can point an ultra-wideband control device at a smart streaming device or smart television that is displaying a television show. As used herein a "smart streaming device" can be any computing device capable of receiving and playing audio/visual content from a remote source. The ultra-wideband control device establishes a communication connection using ultra-wideband frequencies with the smart streaming device or smart television. The user can then gesture the ultra-wideband control device at a second smart streaming device or smart television. The gesture establishes a communication connection with the second smart streaming device or smart television. After the communication connections with the first device and the second device are established, the ultra-wideband control device sends a command to the second device. The command instructs the second device to begin displaying the same television show that is being displayed on the first device. Once the second device is displaying the same television show as the first device, the ultra-wideband control device sends a command to the first device. The command sent to the first device instructs the first device to stop displaying the television show. Additional details on transferring content between two smart streaming devices using the ultra-wideband control device are provided below in relation to FIG. 5.

In another example, a smart streaming device can be playing music. The smart streaming device can receive a location of an ultra-wideband control device and an angle of arrival of a signal from the ultra-wideband control device. The smart streaming device can then determine a location of the ultra-wideband control device relative to the smart streaming device, including determining a distance separating the ultra-wideband control device and the smart streaming device. The smart streaming device can then dynamically adjust the volume of the music based on the distance between the ultra-wideband control device and the smart streaming device. Additional details on controlling output settings of a smart streaming device based on a distance to the ultra-wideband control device are provided below in relation to FIG. 7C.

In a further example, a user can point an ultra-wideband control device at a first smart streaming device, the first smart streaming device participating in a voice and/or video call. The ultra-wideband control device establishes a communication connection with the first smart streaming device. The user then can gesture the ultra-wideband control device at a second smart streaming device. The ultra-wideband control device establishes a communication connection with the second smart streaming device. After the communication connections with the first device and the second device are established, the ultra-wideband control device sends a command to the second device that instructs the second device to join the call that the first device is participating in. Once the second device has joined the call the first device is participating in, the ultra-wideband control device sends a command to the first device that instructs the first device to leave the call. Additional details regarding transferring a call from one smart streaming device to another can be found below in relation to FIG. 4.

In an additional example, a smart streaming device can conduct one of various service events in response to determining a location of an ultra-wideband control device. The smart streaming device can determine a distance between the smart streaming device and the ultra-wideband control device. Based on the distance, the smart streaming device can execute one or more service events for the smart streaming device. In some implementations, based on the distance, the smart streaming device can set a sensitivity of an "air mouse," or a sensitivity of a cursor controlled by motion of the ultra-wideband control device. In other implementations, the smart stream device may include a passive communication component that can receive ultra-wideband communications from the ultra-wideband control device while the smart streaming device is turned off. In response to receiving a command to activate the smart streaming device from the ultra-wideband control device, the passive communication component can generate a signal to turn on the smart streaming device. Additional details regarding conducting service events for smart streaming devices can be found below in relation to FIGS. 6 and 7A-7F.

In another example, a smart streaming device can enable a privacy mode based on a position of an ultra-wideband control device. In some embodiments, the smart streaming device determines if the position of the ultra-wideband control device is within a predefined geofenced area, such as within 3 meters of the smart streaming device. If the ultra-wideband control device is within the geofenced area, the smart streaming device enables a privacy mode, allowing a user of the ultra-wideband control device to access otherwise restricted data, such as profile settings, security settings, restricted content, and other data that would normally not be available to every potential user of the ultra-wideband control device and/or the smart streaming device. Additional details regarding enabling and disabling a privacy mode for a smart streaming device can be found below in relation to FIGS. 7A and 7B.

In yet a further example, a smart streaming device can dynamically switch which user profile is active on the smart streaming device based on identifying a user of an ultra-wideband control device. The smart streaming device can determine a location of the ultra-wideband control device and capture image data or video data of the location of the ultra-wideband control device using an integrated camera of the smart streaming device or another camera associated with the smart streaming device. The smart streaming device then performs image recognition to identify a user at the location of the ultra-wideband control device and compares the identified user to a list of users associated with the smart streaming device. If a match is found between the identified user and an associated user of the smart streaming device, an active profile of the smart streaming device is switched to the identified user. Additional details regarding dynamically switching a user profile for a smart streaming device can be found below in relation to FIG. 7D.

In an additional example, an ultra-wideband control device can be in proximity to multiple devices. Using the position of the ultra-wideband control device and positions of the devices in proximity to the ultra-wideband control device, it can be determined which of the devices the ultra-wideband control device intended to receive a command, such as a power-on command. The command is then routed to the intended recipient device and executed on the intended recipient device.

In another example, an ultra-wideband control device can determine which antenna of a plurality of antennas should be used to transmit information to a smart streaming device. Signal strength data, angle of arrival data, and other data being received from an ultra-wideband receiver of the smart streaming device can be used by the ultra-wideband control device to select the antenna to be used for transmitting information to the smart streaming device ultra-wideband receiver. Additional details for selecting an antenna for an ultra-wideband control device can be found below in relation to FIG. 8.

In a further example, a smart streaming device can be configured based on a position of an ultra-wideband control device. In some implementations, a user can calibrate the smart streaming device to account for the position of the ultra-wideband control device. By calibrating the smart streaming device, it can be ensured that any input received from the ultra-wideband control device is accurately received, such as input controlling a cursor on a display of the smart streaming device. Additional details regarding configuring a smart streaming device can be found below in relation to FIG. 9.

Several implementations are discussed below in more detail in reference to the figures. FIG. 1 is a block diagram illustrating an overview of devices on which some implementations of the disclosed technology can operate. The devices can comprise hardware components of a device 100 that perform a variety of functions related to control of the device 100 and allow for communication with an ultra-wideband control device. Device 100 can include one or more input devices 120 that provide input to the Processor(s)

110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, ultra-wideband application 164, and other application programs 166. Memory 150 can also include data memory 170, e.g., data allowing for the control of device 100 with an ultra-wideband control device, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
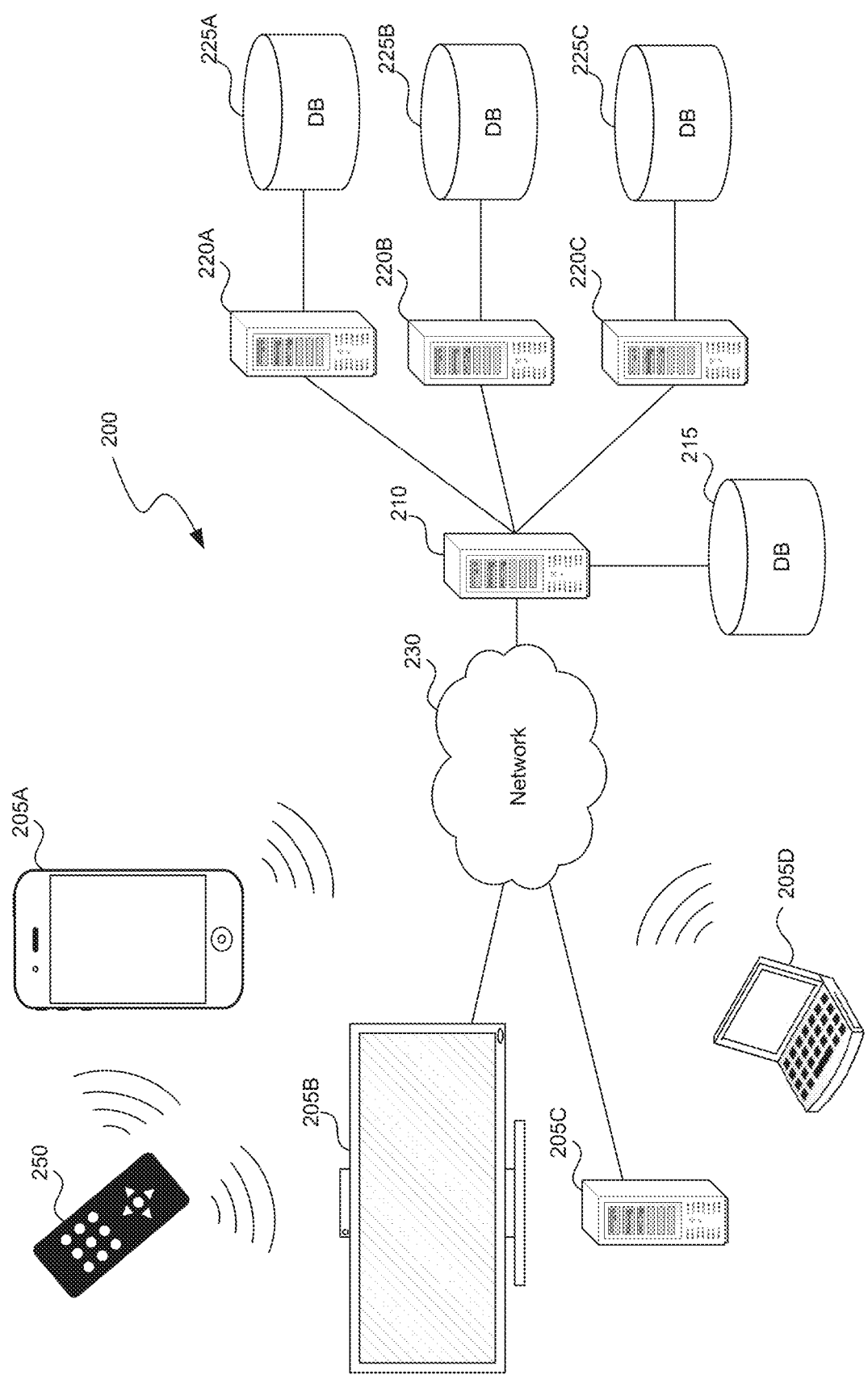
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as user settings data, profile data, user preference data, ultra-wideband control data, command data, and other data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Ultra-wideband ("UWB") remote device 250 utilizes UWB radio technology, which is a short-range wireless communication protocol that operates at very high frequencies (e.g., a broad spectrum of gigahertz frequencies). When a UWB device operates, the UWB device "ranges," or calculates time-of-flight of signals between the UWB device and responding devices. By using larger channel bandwidth (e.g., a channel bandwidth of 500 megahertz) and short pulses (e.g., 1-2 nanoseconds for each pulse), the UWB device can achieve greater ranging accuracy than conventional devices. Because of the short pulse width and large channel bandwidth, UWB devices can track movement of the device in real-time, which allows UWB devices to "understand" relative position and motion of the device. Additionally, UWB devices use angle-of-arrival technology to assist in providing highly precise device location data of both the UWB devices and other objects in the vicinity of the UWB devices. Therefore, UWB radio technology can be used to capture highly accurate spatial and directional data, such as providing data for determining a position of the UWB remote device 250 with an accuracy to the nearest centimeter of the actual position of the UWB remote device 250 in real time. UWB devices can also determine whether an object is stationary, moving closer to the UWB device, or moving away from the UWB device using angle-of-arrival data and device location data.

The UWB remote device 250 can include one or more processors and one or more communication devices, which may be similar to the processors 110 and the communication device(s) described above with regards to FIG. 1. In some implementations, the communication devices of the UWB remote device 250 can include one or more UWB antennas. In some implementations, a multiple-input multiple-output distributed antenna system is employed in the UWB remote device 250. A multiple-input multiple-output distributed antenna system enables the use of short-range networking between the UWB remote device 250 and other UWB-enabled devices. The multiple-input multiple-output distributed antenna system also increases the range of the UWB remote device 250 and ensures more reliable signal reception at the UWB remote device 250. The UWB remote device 250 can also include one or more inertial measurement units ("IMUs"). The IMUs obtain inertial parameters of the UWB remote device 250 as it moves, such as attitude, position, and speed information.

The UWB remote device 250 can also include one or more user input mechanisms. In some implementations, the user input mechanisms may be physical input mechanisms, such as a button, switch, or the like. In other implementations, the user input mechanisms may be an element of a graphical user interface ("GUI"), such as a virtual button or switch on a display. In some implementations, the UWB remote device 250 may be an identification tag, an employee identification card, or the like. In some implementations, the UWB remote device 250 may be a dedicated remote control, a smart wearable, a mobile device, or the like.

The UWB remote device 250 can facilitate communication between one or more of the client computing devices 205. In some implementations, the UWB remote device 250 acts as an intermediary device, receiving a communication from an origin device of the client computing devices 205 over a dedicated short-range communication connection between the origin device and the UWB remote device 250. The UWB remote device 250 can then transmit the communication over a second dedicated short-range communication connection between the UWB remote device 250 and a destination device of the client computing devices 205. In other implementations, the UWB remote 250 does not directly receive and transmit communications between devices, but rather indicates to the origin device which destination device to communicate with and vice versa, over a separate communication channel (e.g., over bluetooth, WiFi, Zigbee, Z-wave, or the Internet connection of network 230).

Using ultra-wideband technology overcomes the shortcomings of other communications technologies. Existing communication technologies do not have the accuracy, positioning capabilities, and radio frequency security of ultra-wideband technology. For example, ultra-wideband technology's ranging capabilities are far superior to ranging capabilities of existing communication technologies. Ultra-wideband technology also operates in bands of the radio spectrum away from currently-congested bands near 2.4 gigahertz, which is used by many conventional communication protocols.

Another significant advantage ultra-wideband technology has over other communication technologies is the use of a physical ("PHY") layer to send and receive data packets. Using the PHY layer, security techniques such as cryptography and random number generation can be employed to help protect communications, which other communication technologies cannot utilize. The bands of the radio spectrum ultra-wideband technology operates in and the enablement of security techniques can help prevent relay or man-in-the-middle attacks, where an actor can utilize a device to attempt to intercept authentication messages between two devices. UWB technology ignores all other devices in the area.

Ultra-wideband technology also delivers greater accuracy in line-of-sight communication scenarios and stronger localization than other communication technologies in non-line-of-sight communication scenarios, which allows ultra-wideband technology to manage environments in which numerous obstacles would typically interfere with communication signals.

Figure 3:
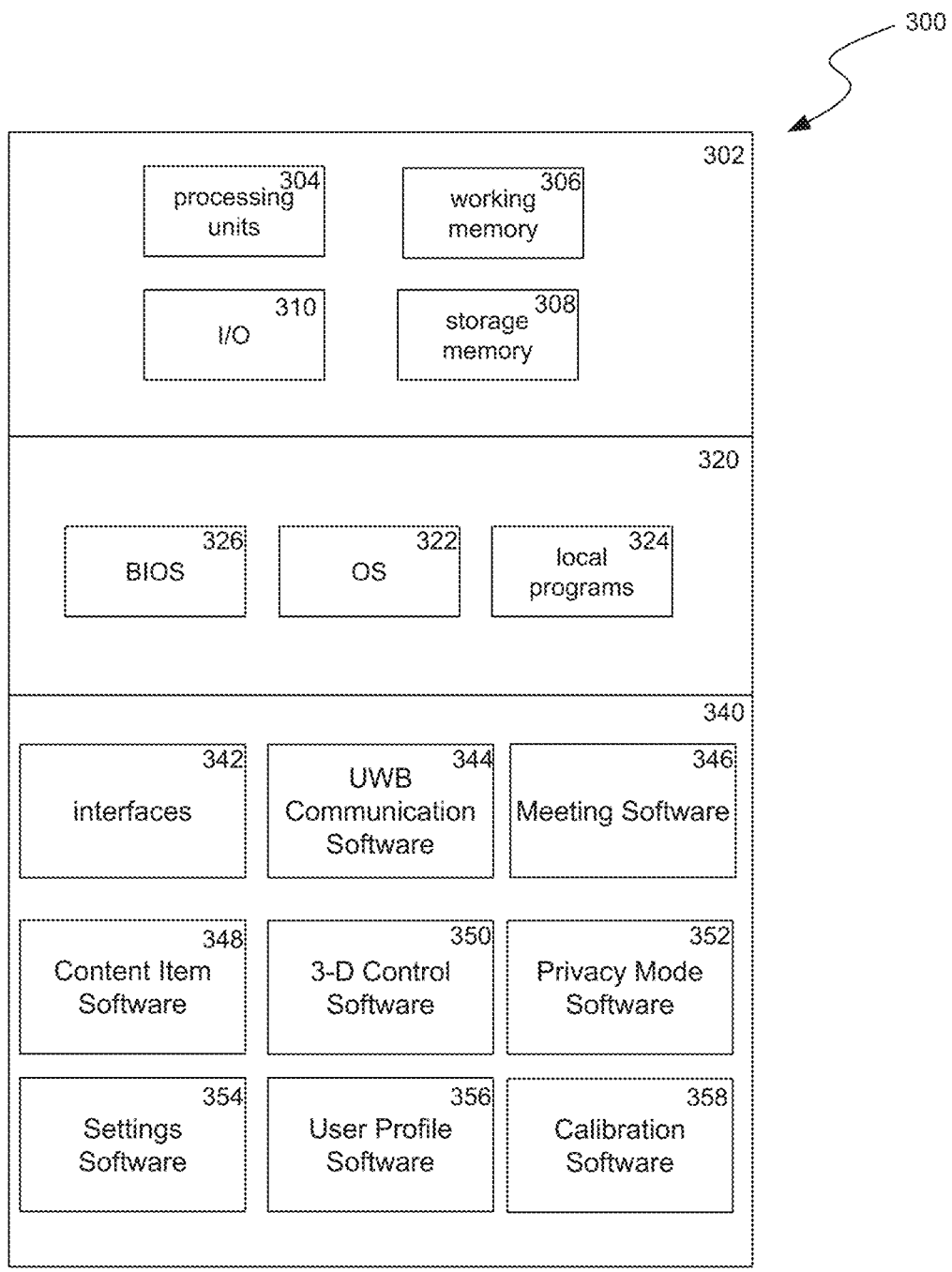
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). One or more of components 300 can be implemented in a client computing device such as client computing devices 205, on a server computing device, such as server computing device 210 or 220, or on a UWB device such as UWB device 250. While shown as being implemented in a single device, in some implementations, various of the components 300 can be implemented on different ones of a client computing device 205, a server computing device 210 or 220, or a UWB device 250. In some implementations, different versions of any of the components 300 can be implemented on each of a client computing device 205, a server computing device 210 or 220, and/or a UWB device 250.

General software 320 can include various applications including an operating system 322, local programs 324, and a basic input output system (BIOS) 326. Specialized components 340 can be subcomponents of a general software application 320, such as local programs 324. Specialized components 340 can include UWB communication software 344, meeting software 346, content item software 348, three-dimensional control software 350, privacy mode software 352, settings software 354, user profile software 356, calibration software 358, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340.

Although depicted as separate components, specialized components 340 may be logical or other nonphysical differentiations of functions and/or may be submodules or code-blocks of one or more applications.

UWB communication software 344 can interface with UWB hardware of I/O 310 to facilitate communication between one or more smart streaming devices and one or more UWB control devices, such as the UWB remote device 250. The UWB communication software 346 can receive commands from the UWB remote device 250, a position of the UWB remote device 250, and other information from the UWB remote device 250. The commands can provide instructions for the one or more smart streaming devices, such as commands to control the volume of the one or more smart streaming devices or commands to transfer content between two different smart streaming devices. The position of the UWB remote device 250 can be used to control various functionality of the smart streaming device, such as dynamically controlling an audio output volume of the smart streaming device. Other data and information that can be received from the UWB remote device 250 can include various content items, identifiers of other smart streaming devices, meeting information, security information, and other data that can be communicated between two smart streaming devices.

In some implementations, UWB communication software 346 can communicate with other smart streaming devices by communicating data directly to a receiving smart streaming device(s). In other implementations, UWB communication software 346 can communicate data to the UWB remote device 250 and an identifier of a destination smart streaming device. The UWB remote device 250 can then communicate the data to the identified destination smart streaming device, acting as an intermediary communication node between the two smart streaming devices. Additional details on communications between the UWB remote device 250 and smart streaming devices are provided below in relation to FIGS. 4-9 below.

Meeting software 346 allows a user to conduct virtual meetings using the smart streaming device. For example, the meeting software 346 can conduct an audio and visual call allowing users to converse with one or more other users of other smart streaming devices. Meeting software 346 can include various functions associated with conducting these audio/video calls. Functionality can include functions for private meetings, such as generation of protected links that allow access to the meeting, generation of passwords, generation of meeting identification codes, and the like. The meeting software 346 can also control various meeting settings, such as the ability of a user of the smart streaming device to select an audio origin device (e.g., select a microphone to use for the meeting) and the ability of a user of the smart streaming device to select a video origin device (e.g., select a camera to use for the meeting). Other meeting settings can include a self-mute feature for the user of the smart streaming device, a share screen feature enabling the user to share content being displayed on the smart streaming device to other participants in the call, a chat feature enabling the user of the smart streaming device to converse via text with other participants in the call, and other meeting settings. Additional details on conducting virtual meetings on smart streaming devices are provided below in relation to FIG. 4.

Content item software 348 allows a user to view, modify, and otherwise interact with one or more content items. Content items can be social media posts, pictures, videos, journalistic articles, audio files, word processing documents, portable document format ("PDF") documents, folders, uniform resource locators ("URLs"), text, and the like. In some implementations, content item software 348 can present content items to the user for viewing, allow a user to modify the content items (e.g., edit a PDF), and perform other functionality related to the content items. In some implementations, content item software 348 organizes one or more content items into a graphical user interface ("GUI") that allows a user to navigate, manage, and preview content items without opening the content items for display. For example, a list of available content items can be presented to a user of the smart streaming device. The list of available content items is displayed in the GUI and can include additional details associated with each content item, such as an edit date of the content item, a source of the content item (e.g., an original user who created the content item or a website where the content item can be accessed), and other metadata associated with each content item. Additional details on interacting with one or more content items on a smart streaming device are provided below in relation to FIG. 5.

Three-dimensional control software 350 allows a user to control a cursor on a display of a smart streaming device using the UWB remote device 250. The smart streaming device receives gestures from the UWB remote device 250 as a series of x, y, z positions, optionally along with velocity and acceleration information associated with the UWB remote device 250. Using these inputs, one or more processors of the smart streaming device can interpret the positions into identified movements, e.g., to move the cursor around the screen or receive inputs, such as selections, from the UWB remote device 250 via one or more user input mechanisms. For example, the user of the UWB remote device 250 may gesture the UWB remote device 250 at a content item being displayed on the display of the smart streaming device and actuate a button on the UWB remote device 250. In response to the gesture, a cursor is moved over the content item being displayed at the smart streaming device. The content item is then selected in response to the actuation of the button of the UWB remote device 250. When the content item is selected, it can be displayed at the smart streaming device. The user of the UWB remote device 250 can then interact with the content item using one or more additional gestures, such as pointing the UWB remote device 250 downwards to scroll down through the content item. Additional details on controlling a cursor on a display of a smart streaming device using the UWB remote device 250 are provided below in relation to FIGS. 4-9.

Privacy mode software 352 allows a user to restrict access to certain content items or settings when the user is associated with an active profile on the smart streaming device. An active profile is a user profile of the smart streaming device that is currently in use. Restricted content items or settings can include such information as private profile information (e.g., password, personal information of the user, and the like), sensitive information, or other information or content items the user wishes to keep private, such as age-restricted content. To access the restricted content, various items of information may be necessary to input, such as providing a user name and password to the smart streaming device. In some implementations, the UWB remote device 250 may be required to be within a certain distance or line-of-sight of a smart streaming device in order to enter the required items of information or may be required to be within a predefined geofenced area in the vicinity of the smart streaming device.

Additional details on enabling and disabling a privacy mode for a smart streaming device are provided below in relation to FIG. 7A.

Settings software 354 allows a user to save settings for use at one or more smart streaming devices. For example, users can select display themes, initialization options (such as preset volume when the smart streaming device is activated), favorite options, and various parameters of the smart streaming device, such as brightness, volume, default input devices, and other settings. In some implementations, the settings can then be associated with a profile of the user at the smart streaming device for later use at the smart streaming device or at another smart streaming device with a profile associated with the same user. Additional details on accessing and modifying settings for a smart streaming device are provided below in relation to FIG. 7C.

User profile software 356 allows a user to save personal information to one or more smart streaming devices, such as the settings described above with regards to settings software 354. For example, a user can save profile name information, password information, personal address information, contact information, payment information, favorite content items, and the like to a memory associated with the smart streaming device. More than one user profile can be stored on each smart streaming device, and each user profile can have an associated settings, user information, and/or favorites that can be loaded and applied to a smart streaming device when the user logs into the smart streaming device. Additional details on the use of user profiles on smart streaming devices are provided below in relation to FIGS. 7A-7C.

Calibration software 358 can calibrate a smart streaming device to a UWB control device, such as the UWB remote device 250. Calibration software 358 can accomplish this by receiving input of a user pointing the UWB remote device 250 at indicated points a display screen associated with the smart streaming device. This can enable the smart streaming device to identify how UWB position information corelates to where on the display screen the UWB remote device 250 is pointing. Calibrating the smart streaming device allows for an accurate detection of where on the display screen the UWB remote device 250 is being pointed. Additional details on calibrating a smart streaming device using the UWB remote device 250 are provided below in relation to FIG. 9.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below. While some blocks described below are described as optional and are shown in dotted lines in the corresponding figures, this does not mean that other blocks are required; but instead this calls attention to specific instances where removals of such blocks can occur.

Figure 4:
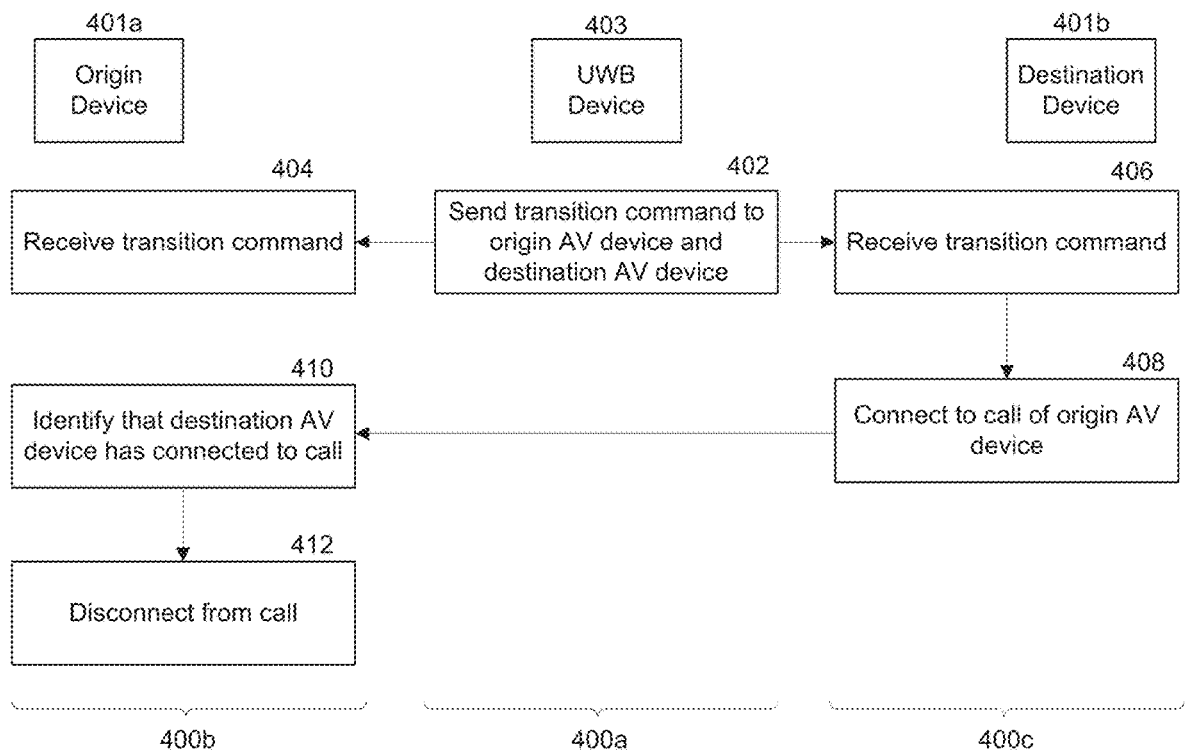
FIG. 4 is a flow diagram illustrating processes used in some implementations for transferring a call between an origin device and a destination device 401b.

FIG. 4 is a flow diagram illustrating processes 400a, 400b, and 400c used in some implementations for transferring a call between an origin device 401a and a destination device 401b. Process 400a is a process associated with a UWB device 403 (e.g., the UWB device 250), process 400b is a process associated with the origin device 401a (e.g., one of the client computing devices 205), and process 400c is a process associated with the destination device 401b (e.g., another of the client computing devices 205). In some implementations, processes 400a, 400b, and 400c can be performed "just in time," e.g. as a response to a user input on the UWB remote 403. In some implementations, one or more of processes 400a, 400b, and 400c can be initialized: as part of a startup procedure for the device that is executing that process, by an operating system of that device, or as part of another program executed by that device (e.g., by a voice calling program, a UWB companion application or driver, etc.)

At block 402, process 400a sends a first transition command to the origin device 401a and sends a second transition command the destination device 401b from the UWB remote device 403. The process 400a sends the transition commands to the origin device 401a and the destination device 401b using UWB communication connections. In some implementations, each of the origin device 401a and the destination device 401b communicates with the UWB remote device 403 using a dedicated UWB communication connection. In other implementations, the origin device 401a and the destination device 401b communicate with the UWB remote device 403 using the same UWB communication connection and may also communicate with one another using the same UWB communication connection.

Determined directions at which the UWB device is pointed can be used to select which devices are the origin device 401a and the destination device 401b. For example, a user may be participating in a video call on one device and there may be two other devices in the user's home that can be joined to the call. The user can point the UWB remote device at the device on which the video call is already connected to signal it as the origin device 401a, then the user may go into another room and point the UWB remote device at one of the other two devices to select it as the destination device 401b. In some implementations, the transition command is sent by the UWB remote device 403 first being pointed at the origin device 401a by a user, indicating the origin device 401a as the origin of outgoing data, and then pointing the UWB remote device 403 at the destination device 401b, indicating the destination device 401b is to receive the outgoing data from origin device 401a.

In some implementations, the user may also actuate a user input mechanism on the UWB remote device 403 when pointing at the origin device 401a and then release the user input mechanism while the UWB remote device 403 is pointing at the destination device 401b. For example, a user may press a button of the UWB remote device 403 when pointing the UWB remote device 403 at the origin device 401a to select the origin device 401a as the source of outgoing data. The user then holds down the button and gestures the UWB remote device 403 to point at the destination device 401b. The user then releases the button of the UWB remote device 403 once the UWB remote device 403 is pointing at the destination device 401b. The release of the button indicates that the destination device 401b is the destination for the data outgoing from the origin device 401a. In other implementations, the user may actuate and release the user input mechanism of the UWB remote device 403 when pointing at the origin device 401a and then actuate and release the user input mechanism again when pointing the UWB remote device 403 at the destination device 401b.

In other implementations, the transition command is sent when the UWB remote device 403 is moved away from the origin device 401a and towards the destination device 401b. For example, origin device 401a and destination device 401b can be in different rooms. If a user carries the UWB remote device 403 from a room containing the origin device 401a to a different room containing the destination device 401b, the transition commands are sent to the origin device

401*a* and the destination device 401*b*. In this case, the UWB remote device may identify the origin device 401*a* by determining that a device within a first threshold distance is participating in a call. The UWS remote device may also select a destination device when the UWB remote device identifies both that the UWB device has moved a second threshold distance away from the origin device and/or has moved within a third threshold distance of a device capable of joining the call.

In some embodiments, the user may actuate a user input mechanism of the UWB remote device 403 while moving in between the location of the origin device 401*a* and the location of the destination device 401*b*. For example, the user may hold down a button of the UWB remote device 403 while moving from the location near the origin device 401*a* to the location near the destination device 401*b*. Process 400*a* identifies the origin device 401*a* when the button is first actuated at the location of the origin device 401*a*. The process 400*a* then waits for the button to be released. When the button is released, process 400*a* identifies the destination device 401*b* as the destination for the data from the origin device 401*a*.

In some implementations, the transition command only identifies the origin device 401*a* and the transition device 401*b* to each other for performing the transfer. For example, the UWB remote device 403 can determine or receive an identifier for the origin device 401 and determine or receive an identifier for the destination device 401*b*. The UWB remote device 403 can then send the identifier of the destination device 401*b* to the origin device 401*a* and send the identifier of the origin device 401*a* to the destination device 401*b*.

In other implementations, the transition command includes additional information for transferring the call. For example, the transition command sent to the origin device 401*a* can include an identifier of the destination device 401*b*. The transition command sent to the destination device 401*b* can include an identifier of the origin device 401*a* and one or more credentials for accessing the call origin device 401*a* is currently participating in, such as a call password, a call ID, a protected or private link to the call, and the like.

In some implementations, the origin device 401*a* sends credentials for accessing the call to the UWB remote device 403, which then includes the credentials for accessing the call in the transition command sent to the destination device 401*b*. In other implementations, the credentials may be sent directly from the origin device 401*a* to the destination device 401*b* over an UWB communication connection (e.g., based on the device identifiers the UWB remote device 403 sent to each of the origin device 401*a* and the destination device 401*b*).

At block 404, process 400*b* receives the transition command at the origin device 401*a*. At block 404, the origin device 401*a* is currently participating in a call. The call can be an audio call, a visual call, or a combination audio/visual ("AV") call. The origin device 401*a* receives the transition command and prepares to transition the call to the destination device 401*b*. In some implementations, the transition command includes additional information for transitioning the call to the destination device 401*b*, such as an identifier of the destination device 401*b*.

At block 406, process 400*c* receives the transition command at the destination device 401*b*. The destination device 401*b* is not currently participating in the call with the origin device 401*a*. The transition command can include an identifier of the origin device 401*a* and information related to the call the origin device 401*a* is participating in. The information related to the call can include a call ID, call participants, call duration, type of call, credentials for accessing the call, such as a password or link to the call, etc.

In some implementations, the destination device 401*b* is configured to identify the call the origin device 401*a* is participating in. For example, by using the identifier of the origin device 401*a*, the destination device 401*b* can access a source of credentials that can be used to connect to the calendar, such as a digital calendar associated with the origin device 401*a*. The calendar associated with the origin device 401*a* can include a meeting data object that is associated with the call the origin device 401*a* is currently participating in. The meeting data object can include credentials for connecting to the call, such as a call ID, a call password, or a link to the call. The process 400*c* can obtain these credentials from the meeting data object and use the credentials to connect to the call. In some implementations, the destination device 401*b* may be required to be logged into a user account associated with the calendar in order to access the calendar and any meeting data objects on the calendar. In other implementations, the transition command sent from the UWB remote device 403 to the destination device 401*b* can include credentials or information that can be used to access the calendar and the meeting data object.

At block 408, the process 400*c* connects the destination device 401*b* to the call the origin device 401*a* is currently participating in. As discussed above, in some implementations, the destination device 401*b* uses credentials to access the call the origin device 401*a* is currently participating in, such as a call ID, call password, or a link to the call. The credentials can be obtained from the transition command or from another data source of credentials, such as a calendar associated with the origin device 401*a*.

In some implementations, in addition to or as an alternative to needing a call ID and/or call password to access the call, the destination device 401*b* may be logged into a user profile associated with the user profile logged in on the origin device 401*a*. The user profile logged in on the destination device 401*b* may be the same user profile and have the same credentials as the user profile logged in on the origin device 401*a* that is participating in the call. In other implementations, the user profile logged in on the destination device 401*b* can be included in a list of profiles or credentials known to be associated with the user profile logged in on the origin device 401*a*. Once the user who is logged in on the destination device 401*b* is authorized to be on the call, the destination device 401*b* is connected to the call.

At block 410, the process 400*b* identifies that the destination device 401*b* has connected to the call the origin device 401*a* is currently participating in. The process 400*b* monitors the call to detect when new participants join the call. In some implementations, the process 400*b* monitors the call to determine that the destination device 401*b* specified in the transition command received at block 404 has joined the call. For example, process 400*b* can monitor the call to identify whether destination device 401*b* has joined the call, such as by matching the destination device identifier of the destination device 401*b* to a phone number, a device ID, an email address, or other unique identifying information of a new participant to the call. Once the identifier of the destination device 401*b* is detected as being in the call by the process 400*b*, the process 400*b* identifies that the destination device 401*b* has joined the call.

In other implementations, the process 400*c* sends an indication to the process 400*b* that the destination device 401*b* has connected to the call. For example, process 400*c* may receive a confirmation that the destination device 401*b* has successfully connected to the call. When the confirmation is received by process 400*c*, process 400*c* sends an indication (sent via the UWB device 403 or another connection between the origin device 401*a* and destination device 401*b*) to the origin device 401*a* that the destination device 401*b* has successfully connected to the call.

At block 412, in response to identifying that the destination device 401*b* has connected to the call, the process 400*b* disconnects the origin device 401*a* from the call. In some implementations, the process 400*b* may send a disconnect command to a system executing the call, which then disconnects the origin device 401*a* from the call. In other implementations, a system executing the call identifies that both the origin device 401*a* and the destination device 401*b* are participating in the call, and disconnects the origin device 401*a*. In further implementations, when the destination device 401*b* successfully connects to the call, the process 400*c* sends an indication to the process 400*b* indicating that the destination device 401*b* has connected to the call and the origin device 401*a* can be disconnected from the call. Because the destination device 401*b* is now connected to the call, the user can continue to participate in the call using the destination device 401*b*. In some implementations, block 412 is skipped and both the origin device 401*a* and destination device 401*b* continue to participate in the call.

Figure 5A:
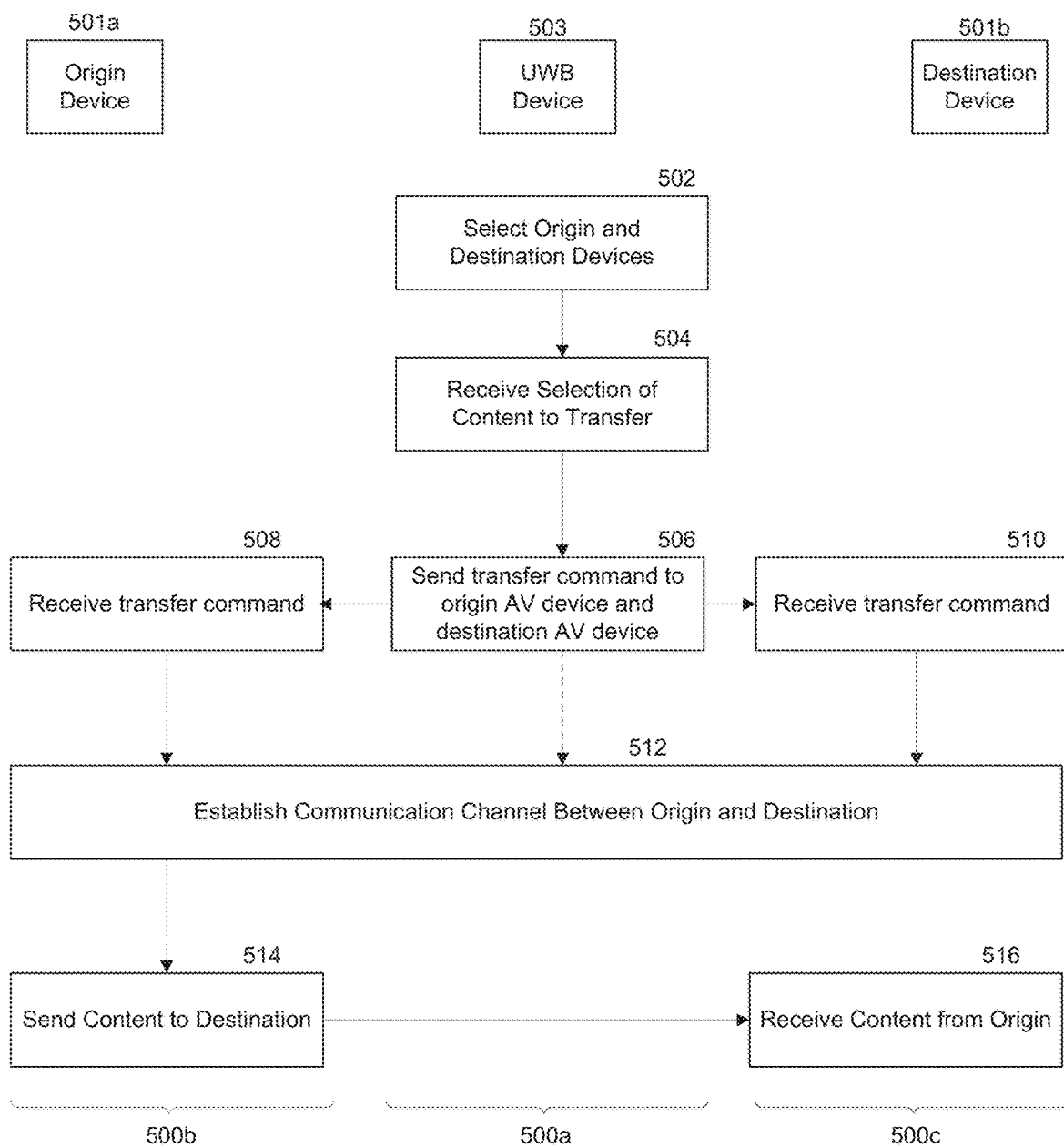
FIG. 5A is a flow diagram illustrating processes used in some implementations for transferring one or more content items from an origin device to a destination device.

FIG. 5A is a flow diagram illustrating processes 500*a*, 500*b*, and 500*c* used in some implementations for transferring one or more content items from an origin device 501*a* (e.g., one of the client computing devices 205) to a destination device 501*b* (e.g., another of the client computing devices 205). In some implementations, processes 500*a*, 500*b*, and 500*c* can be performed "just in time," e.g. as a response to a user input on a UWB remote 503 (e.g., UWB remote 250). In some implementations, one or more of processes 500*a*, 500*b*, and 500*c* can be initialized: as part of a startup procedure for the device that is executing that process, by an operating system of that device, or as part of another program executed by that device (e.g., by a media display program, a UWB companion application or driver, etc.)

At block 502, process 500*a* selects the origin device 501*a* and the destination device 501*b*. In some implementations, to select the origin device 501*a*, a user points the UWB remote 503 at a computing device that the user wishes to be the origin device 501*a*. The origin device 501*a* includes content the user wishes to select to transfer. To select the destination device 501*b*, the user then points the UWB remote 503 at a computing device the user wishes to be the destination device 501*b*. The destination device 501*b* is a computing device the user wishes to transfer content to.

In some implementations, the user must also actuate a user input mechanism of the UWB remote 503 while pointing the origin device 501*a* and the destination device 501*b* to select the origin device 501*a* and the destination 501*b*. For example, the user can first point the UWB remote device 503 at the origin device 501*a* and actuate a button of the UWB remote device 503. While holding down the button, the user then gestures the UWB remote device 503 to point the UWB remote device 503 at the destination device 501*b*. The user then releases the button of the UWB remote device 503 while pointing the UWB remote device at the destination device 501*b*. The initial actuation of the button while pointing at the origin device 501*a* identifies the origin device 501*a* as the source of outgoing data. The release of the button while pointing the UWB remote device 503 at the destination device 501*b* identifies the destination device 501*b* as being the destination for the data from the origin device 501*a*.

In other implementations, the user actuates a user input mechanism while pointing the UWB remote device 503 at the origin device 501*a* and then releases the user input mechanism while still pointing at the origin device 501*a*. The actuation and release of the user input mechanism while pointing the UWB remote device 503 at the origin device 501*a* identifies the origin device 501*a* as the source of outgoing data. The user then gestures the UWB remote device 503 to point the UWB remote device 503 at the destination device 501*b*. While pointing the UWB remote device 503 at the destination device 501*b*, the user actuates the user input mechanism and then releases the user input mechanism. The actuation and release of the user input mechanism while pointing the UWB remote device 503 at the destination device 501*b* identifies the destination device 501*b* as the smart streaming device to receive data from the origin device 501*a*.

At block 504, the process 500*a* receives a selection of one or more content items to transfer between the origin device 501*a* to the destination device 501*b*. In some implementations, a display of the origin device 501*a* displays one or more content items. Content items can be, for example, social media posts, videos, images, articles, audio files, word processing documents, portable document format ("PDF") documents, folders, uniform resource locators ("URLs"), text, and the like. In other implementations, the selection of one or more content items can include selecting one or more configurations or settings to be transferred to the destination device 501*b*, one or more personal identification items to be transferred to the destination device 501*b*, and other information to be transferred between two smart streaming devices.

In some implementations, a user can point the UWB remote device 503 at one or more of the displayed content items to select one or more of the content items. In some implementations, in order to select the content items, the user may also actuate a user input mechanism of the UWB remote 503 while pointing at the content item(s). For example, one or more content items may be displayed in a GUI on the display associated with the origin device 501*a*. The user can point the UWB remote device 503 at a content item (or an icon representing a content item) of the one or more content items and press a button of the UWB remote device 503. When the button is pressed, the content item is selected.

In other implementations, content items may be selected via a GUI being displayed on a display associated with the origin device 501*a* and one or more user input mechanisms on the UWB remote 503. For example, the GUI may be displayed on the origin device 501*a*. The user may then use one or more user input mechanisms on the UWB remote 503 to navigate through the GUI and one or more other user input mechanisms on the UWB remote 503 to select one or more content items from the GUI. For example, a user may use a track pad or lever of the UWB remote device 503 to navigate vertically through a list of content items displayed within the GUI, highlighting each content item in turn each time a swipe is performed on the track pad or the lever is actuated. The user may then use a button of the UWB remote device 503 or tap the track pad to select the highlighted content item.

In some implementations, actions of blocks 502 and 504 may be combined. For example, the origin device 501*a* and the content item can be selected with the same user action via the UWB device 503. In this case, for example, the user may point the UWB device 503 at a photo displayed on a device to both select that device as the origin device 501a and select that photo as the selected content item. As another example, the destination device 501b a destination location of the destination device 501b can be selected with the same user action via the UWB device 503. In this case, for example, after the user selected the content item on the origin device 501a, the user may point the UWB device 503 at a particular location on a device to both select that device as the destination device 501b and to trigger a rule associated with the location on the destination device specifying how to handle receiving the content item. Such rules, for example, can define for a type of the content item and/or a location on a display of the destination device 501b, what action to perform for the received content item. For example, the rules can define an application to execute to display the content item (such as an application indicated at the location of the destination device 501b), a location to store the received content item (such as a folder indicated at the location of the destination device 501b), a social media or communication action to take (e.g., a type of the content item can be mapped to a way to post the content item to social media, a person to send the content item to, or a message to send to a corresponding person), or various combinations of these.

At block 506, the process 500a sends transfer commands to the origin device 501a and the destination device 501b using the UWB remote device 503. In some implementations, the UWB remote device 503 sends the transfer command to the origin device 501a over an UWB communication connection and sends the transfer command to the destination device 501b over a separate UWB communication connection. In other implementations, the UWB remote device 503 sends the transfer commands to the origin device 501a and the destination device 501b over the same UWB communication connection. In some implementations, the transfer command sent to the origin device 501a includes an identifier of the destination device 501b and/or an identifier of the content item(s) selected to transfer. In other implementations, the transfer command sent to the origin device 501a only provides an identifier of the content item(s) selected to transfer. In some implementations, the transfer command sent to the destination device 501b includes an identifier of the origin device 501a. In other implementations, the transfer command sent to the destination device 501b includes an identifier of the origin device 501a and an identifier of the content item(s) to be transferred to the destination device 501b. The identifier of the content item(s) can be used to verify that all of the selected content item(s) have been transferred, as described below with regards to block 514.

At block 508, the process 500b receives the transfer command at the origin device 501a. The transfer command received at the origin device 501a can include an identifier of the content items(s) to transfer and/or identifying information of the destination device 501b, such as an identifier of the destination device 501b.

At block 510, the process 500c receives the transfer command at the destination device 501b. The transfer command received at the destination device 501b can include identifying information of the origin device 501a and can also include an identifier of the content item(s) to be received from the origin device 501a. In some implementations, the transfer command is received at the origin device 501a and the destination device 501b simultaneously. In some implementations, a transfer command is only sent to the origin device 501a and process 500c does not perform block 510.

At block 512, the processes 500b and 500c establish a communication channel between the origin device 501a and the destination device 501b. In some implementations, the communication channel is established directly between the origin device 501a and the destination device 501b using a UWB, WiFi, bluetooth, NFC, Internet, or other network communication connection. In other implementations, the communication channel is established with the UWB remote device 503 as an intermediary device. For example, the process 500b can establish an UWB communication connection between the origin device 501a and the UWB remote device 503. The process 500c can also establish an UWB communication connection between the destination device 501b and the UWB remote device 503. In these implementations, the UWB remote device 503 first receives the selected content item(s) from the origin device 501a. Process 500a then transmits the selected content item(s) to the destination device 501b.

At block 514, the process 500b sends the selected content item(s) from the origin device 501a through the established communication channel to the destination device 501b. In some implementations, the UWB remote device 503 acts as an intermediary device, and therefore receives the one or more content items from the origin device 501a before sending the one or more content items on to the destination device 501b.

At block 516, the process 500c receives the selected content item(s) at the destination device 501b. In some implementations, the destination device 501b can store the content item(s) for later use or display, such as storing the content item(s) in a memory associated with the destination device 501b. In other implementations, the destination device 501b can display the one or more content items on a display associated with the destination device 501b immediately upon receiving the content item(s). In some embodiments, the process 500c can take additional actions associated with the content item(s), such as automatically playing video or audio files. In further implementations, if the content item(s) includes a configuration file for the destination device 501b, the destination device 501b can immediately initiate or execute the configuration file to change one or more configuration settings on the destination device 501b, such as changing a default start-up volume of the destination device 501b. As discussed above, the type of the content item and/or where on the destination device 501b the content item was dropped by the transfer command can trigger one or more rules that map to additional actions such as how to display or store the content item, where to post the content item, how to share the content item, what other communication session to setup, etc.

In some implementations, the UWB remote device 503 can receive meeting log-in credentials as the content item(s). The process 500b sends, via the UWB remote device 503, meeting credentials from the origin device 501a to the destination device 501b. Once the process 500c has received the meeting credentials at the destination device 501b, the process 600c can invoke a corresponding rule to connect the destination device 501b to the meeting and initiate an audio and/or video feed from the destination device 501b to the meeting to allow the user to participate in the meeting.

In other implementations, the process 500c can receive account information or user information as the content item(s). The process 500c can then invoke a rule to use the account information or the user information to perform various functions at the destination device 501b. The functions can include logging a user into the destination device 501b, applying one or more favorite settings associated with the user to the destination device 501b, displaying a favorite content item(s) of the user on a display associated with the destination device 501b, and other functions.

Figure 5B:
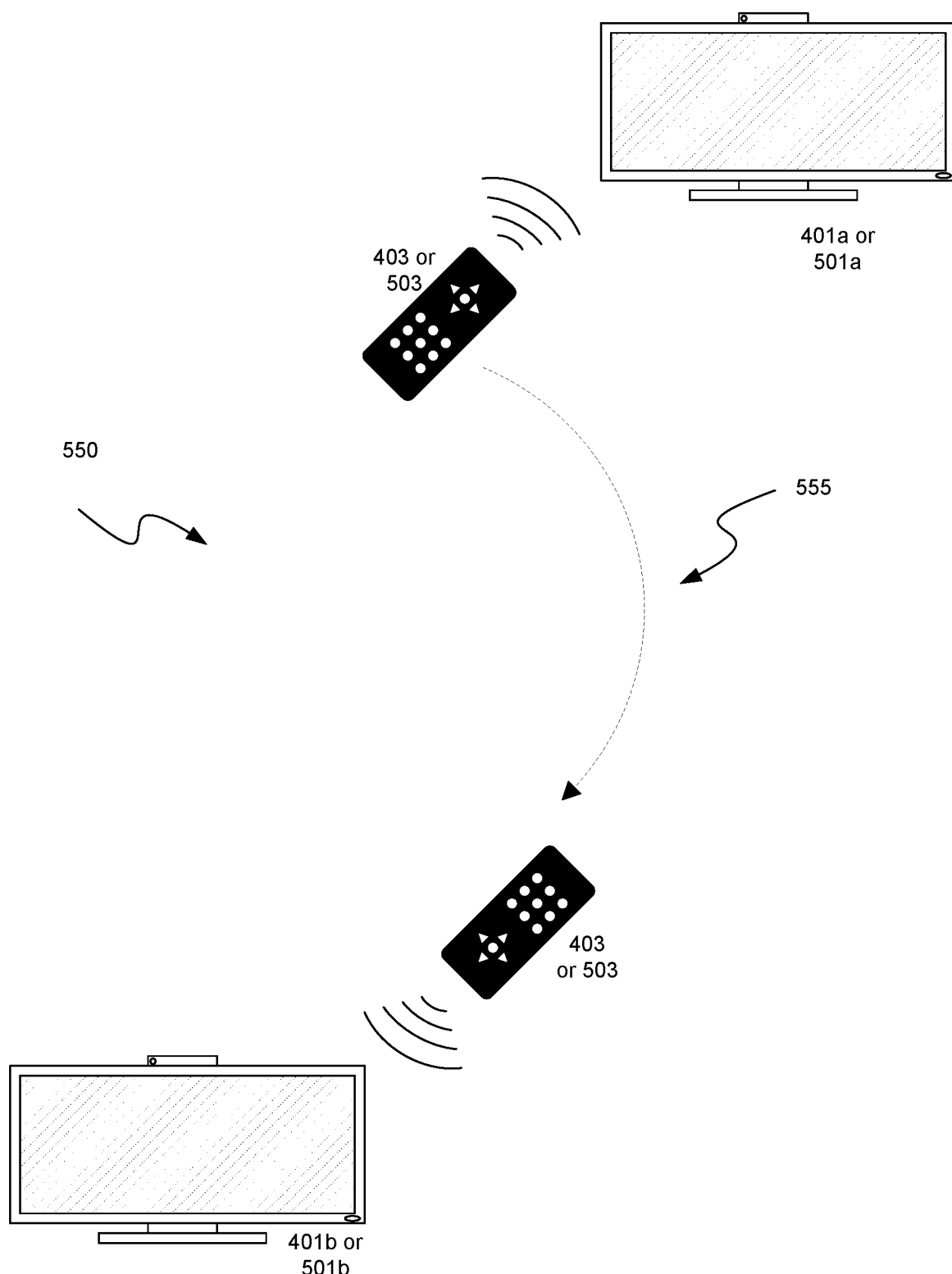
FIG. 5B is a conceptual diagram illustrating some implementations for transferring information between an origin device and a destination device.

FIG. 5B is a diagram illustrating an environment 550 used in some implementations for transferring information between an origin device, such as origin device 401a or 501a, and a destination device, such as destination device 401b or 501b. As described above with regards to FIG. 4 and FIG. 5A, the UWB remote device 403 or 503 can be pointed at origin device 401a or 501a by a user of the UWB remote device 403 or 503. The UWB remote device 403 or 503 communicates with the origin device 401a or 501a over a UWB communication connection. Data can be communicated over the UWB communication connection between the origin device 401a or 501a and the UWB remote device 403 or 503. For example, the UWB remote device 403 or 503 can identify the origin device 401a or 501a as the computing device from which data will transfer.

The user of the UWB remote device 403 or 503 then performs a gesture 555 to point the UWB remote device 403 or 503 at destination device 401b or 501b. Much like when the UWB remote device 403 or 503 is pointed at the origin device 401a or 501a, the UWB remote device 403 or 503 communications with the destination device 401b or 501b over a UWB communication connection. The UWB remote device 403 or 503 can then identify the destination device 401b or 501b as the computing device to which data will be transferred. A communication channel can be established between these devices and a selected content item or call information can be transferred. Where call information is transferred, the destination device 401b can join the call, causing the origin device 401a to leave the call.

Figure 6:
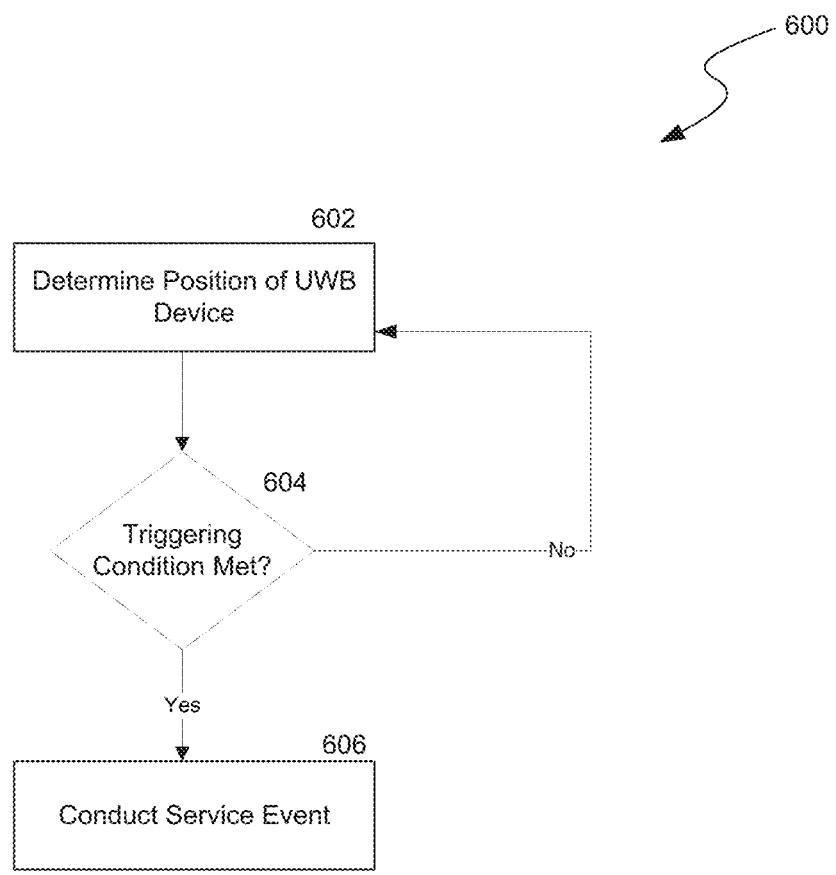
FIG. 6 is a flow diagram illustrating a process used in some implementations for conducting a service event for a smart streaming device based on a position of an ultra-wideband remote device.

FIG. 6 is a flow diagram illustrating a process 600 used in some implementations for conducting a service event for a smart streaming device (e.g., one of devices 205) based on a position of the UWB remote device (e.g., UWB remote device 250). In some implementations, process 600 can be performed as a response to a user input on the UWB remote 250. In other implementations, the process 600 begins when the smart streaming device is activated, and sits idle or "in the background" until a triggering event, such as the UWB remote 250 coming within a threshold distance of the smart streaming device, occurs. When the triggering event occurs, the process 600 executes.

At block 602, the process 600 determines a position of the UWB remote device. UWB technology allows for the smart streaming device to determine the position of the UWB remote device by determining a distance between the smart streaming device and the UWB remote device and an angle of arrival of the signal to the smart streaming device from the UWB remote device. Using the distance and the angle of arrival, a position of the UWB remote device relative to the smart streaming device can be determined.

At decision block 604, the process 600 can optionally determine if a triggering condition for the service event has occurred. The triggering condition can be receiving a button press from the UWB remote device (e.g., a power button or other button), receiving an interaction from the UWB remote device with a GUI on the smart streaming device (e.g., selecting a content item presented within the GUI), receiving a voice command, and the like. In some implementations, no triggering event is required, and the process 600 automatically proceeds to conducting a service event as described below with regards to block 606 after the position of the UWB remote device is determined.

If the triggering condition has not occurred ("No" at decision block 604), the process 600 returns to waiting for the triggering condition to occur. In some implementations, the process 600 can continue to detect the position of the UWB remote device while awaiting the triggering condition, or continuously detect the position the UWB remote device, including detecting changes in the position of the UWB remote device. In other implementations, the process 600 can re-determine the position of the UWB remote device as described with regards to block 602 once the triggering condition occurs.

At block 606, and optionally once the triggering condition occurs ("Yes" at decision block 604), the process 600 conducts a service event. The service event can be one of a variety of functions available to the smart streaming device.

For example, an "air mouse sensitivity" may be adjusted based on the distance between the UWB remote device and the smart streaming device. An air mouse allows a user to control a cursor on a display of the smart streaming device using hand gestures performed by the user holding the UWB remote device. For example, the cursor can be positioned at a point on the display that the user of the UWB remote device is pointing the UWB remote device at. In some implementations, the UWB remote device must be in a hand performing the gesture. Based on the distance between the UWB remote device and the smart streaming device, the sensitivity of the air mouse may be altered. For example, the closer the UWB remote device is to the smart streaming device, the lower the sensitivity can be, which requires larger gestures to move a cursor on the display of the smart streaming device. In contrast, the farther the UWB remote device is from the smart streaming device, the higher the sensitivity can be, which means smaller movements are required to move the cursor the same distance across the display.

Another example of a service event is allowing three-dimensional control of the smart streaming device with the UWB remote device. The position of the UWB remote device can include data tracking rotations and movements in x, y, and z axes. The service event can take these inputs in all three axes and interpret the inputs into a movement in a user interface on a display of the smart streaming device, enabling three-dimensional control input for showing new screen effects and creating new possibilities for gaming applications. In some implementations, different actions or controls can be mapped to various UWB remote device positions. In one implementation, a user may raise the UWB remote device to point straight up in the air. In response, the display may scroll upwards to show different content than is currently displayed, transition to a new view of a GUI, or navigate through a vertical list of content items. In another implementation, the user may make a gesture, such as moving the hand holding the UWB remote device, in a circular motion. In response to detecting the circular motion movement, the smart streaming device may increase an output volume or decrease an output volume, or may highlight or draw a circle graphic around a particular content item the user is "drawing" the circle around on the GUI.

In other implementations, the smart streaming device can be activated as a service event. For example, the smart streaming device, even when in an "off" state, may have at least one passive communication component operating to detect the UWB remote device and receive commands from the UWB remote device. When the UWB remote device is pointed at the smart streaming device while the smart streaming device is in the "off state", the smart streaming device can switch to an "on state", or operating state. Optionally, when the UWB remote device is pointed at the smart streaming device, the user of the UWB remote device can be required to push a power button or actuate some other user input mechanism to switch the smart streaming device to the "on state."

Additional details regarding particular service events that can be conducted are described with regards to FIGS. 7A-F.

Figure 7A:
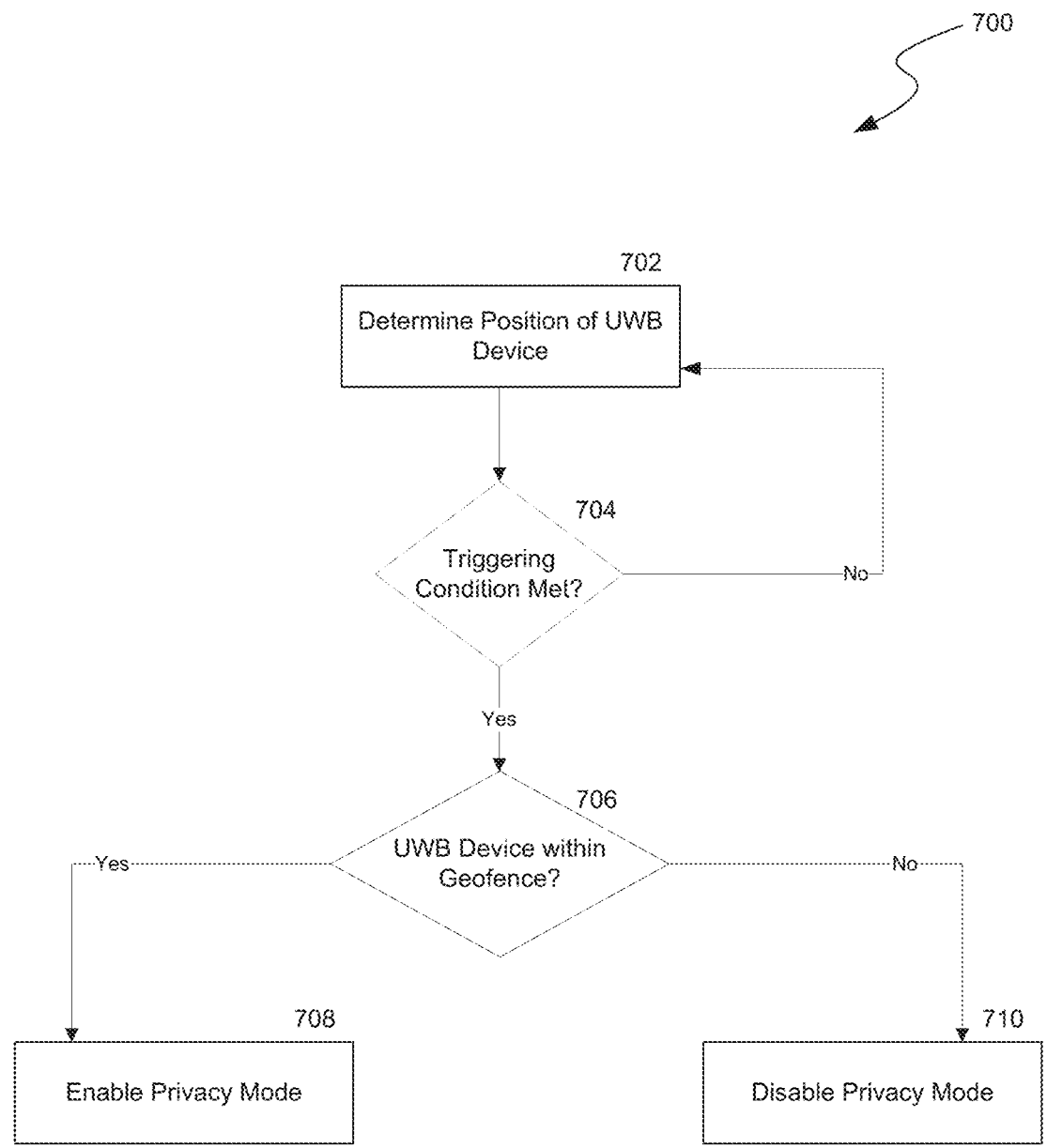
FIG. 7A is a flow diagram illustrating a process used in some implementations for enabling or disabling a privacy mode for a smart streaming device based on a position of an ultra-wideband remote device.

FIG. 7A is a flow diagram illustrating a process 700 used in some implementations for enabling or disabling a privacy mode for a smart streaming device based on a position of the UWB remote device (e.g., UWB remote device 250).

At block 702, the process 700 determines a position of the UWB remote device. Much like block 602 of FIG. 6, an angle of arrival and distance of the UWB remote device in relation to the smart streaming device is used to determine a position of the UWB remote device within a vicinity of the smart streaming device.

At decision block 704, the process 700 can optionally detect a triggering condition. The triggering condition can optionally be detected much like the triggering condition associated with decision block 604 of FIG. 6, such as detecting an actuation of a user input mechanism of the UWB remote device or receiving a voice command.

At decision block 706, and optionally once the triggering condition occurs ("Yes" at decision block 604), the process 700 determines if the position of the UWB remote device is within a geofenced area. The geofenced area is a virtual area associated with the smart streaming device. In some implementations, the size and position of the geofenced area can be a preset size and position set in a vicinity of the smart streaming device, such as a defined rectangular area located one meter in front of the smart streaming device. The defined area can also be a room the smart streaming device is located in, a building the smart streaming device is located in, or another area. In other implementations, the geofenced area can be a defined area surrounding the smart streaming device, such as a circular area of one meter in radius around the smart streaming device. In further implementations the geofenced area can be set and/or adjusted by a user of the smart streaming device. For example, the user may use the UWB remote device to interact with a GUI displayed on a display associated with the smart streaming device. The GUI can include controls that allow the user to set an area as the geofenced area, such as setting a length and width of the geofenced area and a location of the geofenced area relative to the smart streaming device.

If the UWB remote device is located within the geofenced area ("Yes" at decision block 706), the process 700 proceeds to block 708 where it enables a privacy mode of the smart streaming device. The privacy mode allows heightened user access to the smart streaming device, such as being able to access user settings and configurations files. For example, a user may only be able to edit configuration files of the smart streaming device when the privacy mode is enabled. When the privacy mode is enabled, a user can also access profile information that may be otherwise private (such as user name, password, security question, and account recovery information), access additional profile features (e.g., being able to make a call from the smart streaming device), access otherwise restricted content (such as age-controlled content), and the like.

In some implementations, when the UWB remote device is within the geofenced area, an additional verification step may be needed to confirm that the user of the UWB remote device should be accessing the privacy mode of the smart streaming device. In some implementations, the additional verification step can include entering a password, saying a pass phrase voice command, entering a pass code, and the like. In some implementations, the user is prompted by the smart streaming device (via an audio command, a graphical component of a GUI, or a similar prompt) to enter this additional information to access the privacy mode and complete the additional verification step.

In some embodiments, only a subset of user profiles saved on the smart streaming device can access the privacy mode. If the user attempting to access the privacy mode is not associated with a user profile within the subset, the user will not be allowed access to the privacy mode. The subset of user profiles able to access the privacy mode can be modified by users with administrative privileges on the smart streaming device or can be edited by accessing a configuration file defining the subset with particular access credentials.

If the UWB remote device is not located within the geofenced area ("No" at decision block 706), the process 700 continues to block 710 where it disables the privacy mode of the smart streaming device. By disabling the privacy mode, a user of the smart streaming device will not be able to access settings and configurations files, access profile information that may be otherwise private, access additional profile features (e.g., being able to make a call from the smart streaming device), access otherwise restricted content, and the like.

Figure 7B:
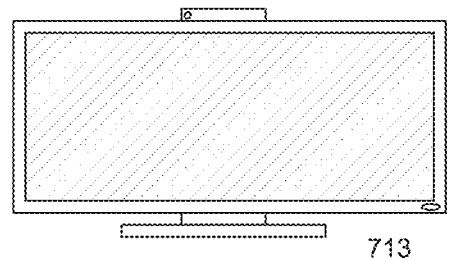
FIG. 7B is a conceptual diagram illustrating an ultra-wideband device within a geofenced area according to some implementations of the invention.
Figure 7B:
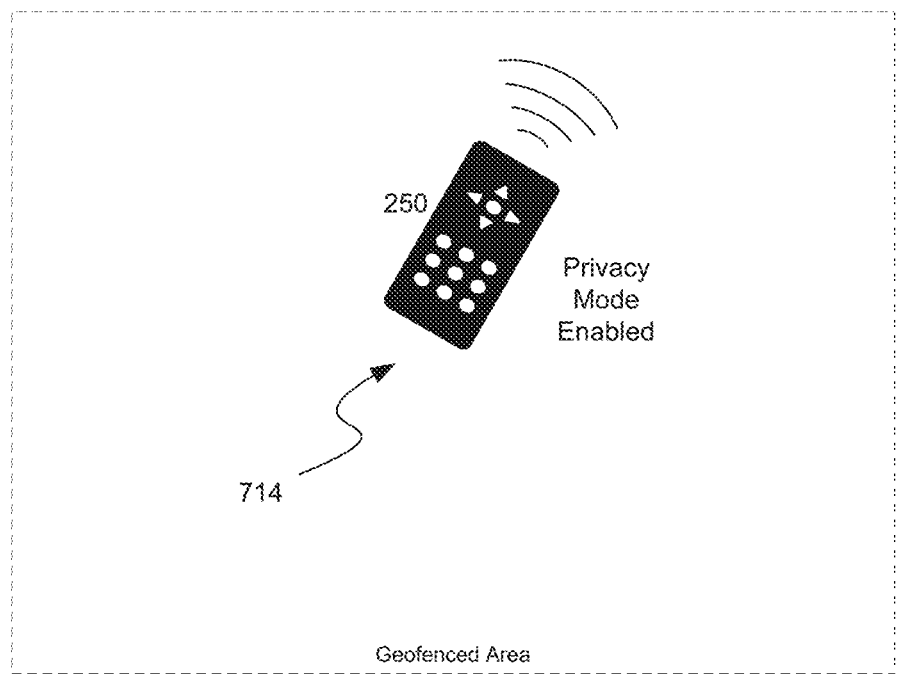
Figure 7B:
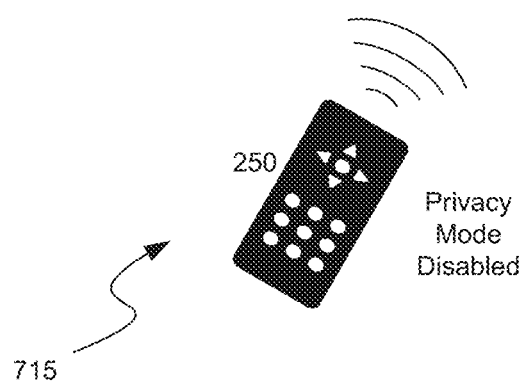

FIG. 7B is a conceptual diagram 711 illustrating a UWB remote device (e.g., UWB remote device 250) within a geofenced area 712 according to some implementations of the invention. As described above, the geofenced area 712 can be a defined area, such as a rectangular area, in the vicinity of smart streaming device 713. In other implementations, the geofenced area 712 can be a different shape and a different size and can be located at different locations relative to the smart streaming device 713.

If the UWB remote device is located within the geofenced area 712 (at first location 714), a privacy mode of the smart streaming device 713 is enabled, allowing the user of the UWB remote device to access features of the smart streaming device 713 that are accessible only when the privacy mode is enabled. In contrast, if the UWB remote device is located outside the geofenced area 712, such as second location 715, the privacy mode of the smart streaming device 713 is disabled. If the privacy mode is disabled, the features of the smart streaming 713 that are accessible only when the privacy mode is enabled are not accessible to the user of the UWB remote device.

Figure 7C:
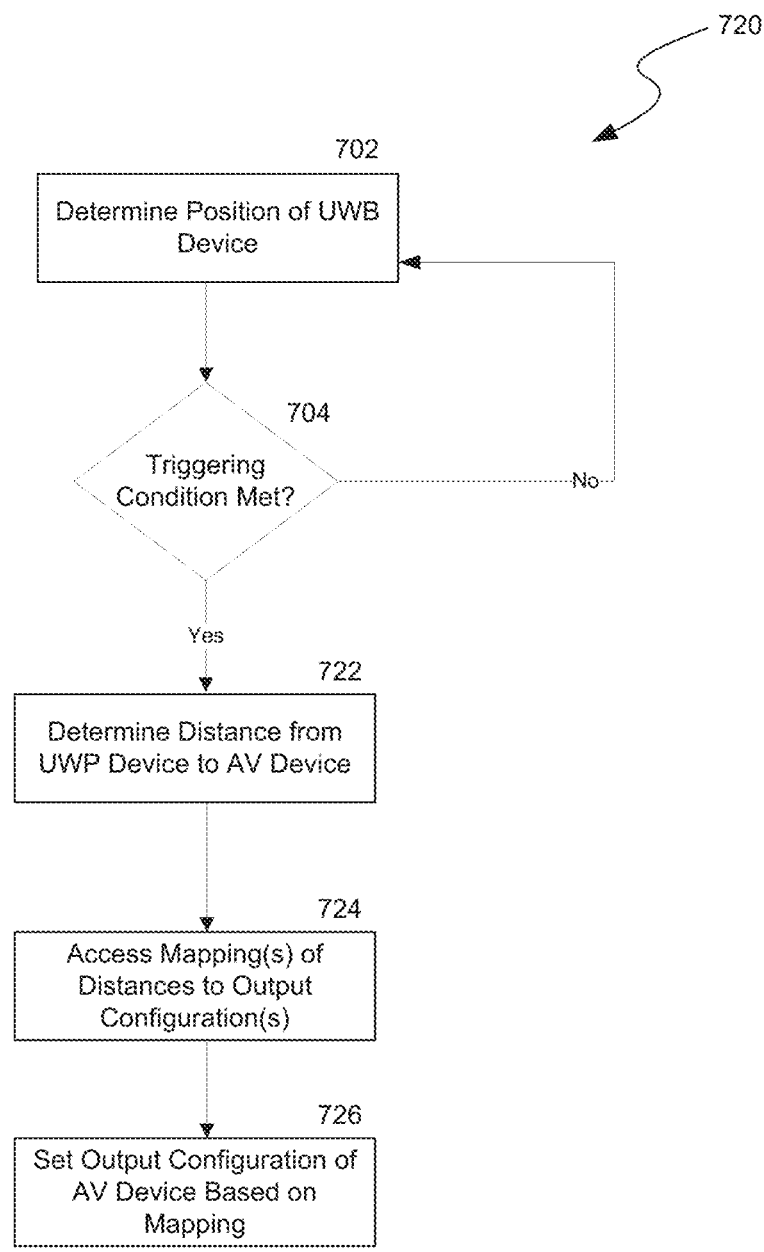
FIG. 7C is a flow diagram illustrating a process used in some implementations for setting an output configuration for a smart streaming device based on a position of an ultra-wideband remote device.

FIG. 7C is a flow diagram illustrating a process 720 used in some implementations for setting an output configuration for a smart streaming device based on a position of a UWB remote device (e.g., UWB remote device 250).

The process 720 determines the position of the UWB remote device as in block 702 of FIG. 7A and then may optionally wait for a triggering condition to occur such as in decision block 704 of FIG. 7A.

At block 722 and, where block 704 is performed, in response to the triggering condition occurring, the process 720 determines the distance between the UWB remote device and the smart streaming device. In some implementations, the process 720 uses the position of the UWB remote device obtained at block 702 to determine the distance, as the distance between the UWB remote device and the smart streaming device is one component of the position of the UWB remote device. In other implementations, the process 720 re-determines the distance to the UWB remote device. In one example, the process 720 can use a signal strength between the UWB remote device and the smart streaming device to determine a distance between the UWB remote device and the smart streaming device.

At block 724, the process 720 accesses one or more mappings of distances to output configurations. The one or more mappings can be stored in a memory of the smart streaming device. The mappings include output configuration settings for the smart streaming device, such as display resolution, brightness, video source, audio volume, audio source, and the like. Each mapping can correspond to one or more distances or ranges of distances. For example, if the UWB remote device is one meter away from the smart streaming device, a mapping associated with one meter can be accessed. In another example, if the UWB remote device is one meter away from the smart streaming device, a mapping associated with a range of zero to two meters can be accessed. The mappings may be linear or non-linear. For example, if the mapping is linear, for every 0.5 meters the UWB remote device is away from the smart streaming device, the audio volume of the mapping is increased by one step. In another example, if the mapping is non-linear, the volume may increase by one step for the first 0.5 meters the UWB remote device is away from the smart streaming device, increase by two steps for the next 0.5 meters the UWB remote device is away from the smart streaming device, and so on.

Other factors may be considered in the selection of the mapping. For example, an amount of ambient light in a space containing the smart streaming device can be used in addition to the distance between the UWB remote device to determine which mapping(s) to access. The other factors can be gathered by the smart streaming device, such as determining an amount of ambient light in the space using a camera of the smart streaming device. Based on these additional factors, the mapping can be selected. For example, based on the amount of ambient light in the space containing the smart streaming device and the distance between the UWB remote device and the smart streaming device, a display brightness for the smart streaming device can be selected.

In some implementations, the mappings may be further be selected based on a user profile. For example, if the user associated with the UWB remote device is hearing impaired in one ear, audio volume controls in the mappings may be modified to enable the user to hear, such as having an increased audio volume even at short distances. In one implementation, the user can set, select, and/or modify these mappings to fit the user's needs, such as modifying a volume mapping to have increased volume at all distances to compensate for hearing impairment of the user. In some implementations, the user can select one or more mappings from an available set of mappings, the available set of mappings including mappings that take into account various needs of users.

At block 726, the process 720 sets an output configuration of the smart streaming device based on the accessed mapping(s). For example, if the mapping for "distance is one meter or less" is accessed, settings associated with the mapping are applied to the smart streaming device, such as lowering an audio volume and reducing a brightness of a display screen of the smart streaming device. In another example, if the mapping for "distance is 3 meters or greater" is accessed, setting associated with the mapping are applied to the smart streaming device, such as increasing an audio volume, enlarging a video display portion of the display, and the like.

In some implementations, the output configuration may include setting content and font size dynamically based on the distance between the smart streaming device and the UWB remote device. For example, if the user is two meters away from the smart streaming device, content and/or font displayed on the display of the smart streaming device may be displayed at a true size, or original size of the content and/or font. As the UWB remote device is moved further away from the smart streaming device, the content and/or font may be enlarged in size. As the UWB remote device is moved closer to the smart streaming device, the content and/or font may be reduced in size. In some implementations, a pre-defined scale is used to define a relationship between the distance separating the UWB remote device and the smart streaming device and the size of the content and/or font. For example, for every meter of distance between the UWB remote device and the smart streaming device, the content and/or font may be scaled up in size by one step (e.g., one font size).

In some implementations, the process 720 can associate the UWB remote device with one or more microphones. In these implementations, the position of the UWB remote device can be used to track a distance between a microphone of the one or more microphones and a speaker of the smart streaming device. Using the distance, the process 720 can determine travel time of sound from the speaker to the microphone. The process 720 can then use this information along with an audio return channel of the speaker to cancel any echo caused by the microphone by buffering input from the microphone and using the buffered input for delayed echo cancellation. For example, the speed of sound is approximately 340 meters per second. Using this number and a distance measurement to the microphone, the process 720 can determine that it will take 15 milliseconds for the speaker sound to reach the microphone. By accounting for this in the buffered input, echo can be cancelled. In some implementations, the process 720 can alternately configure audio output based on the UWB device position. For example, the smart streaming device can have an array of speakers for directed audio output where which speakers are activated and at which level can direct the audio from the speaker array to particular locations. The process 720 can cause this speaker array activation to direct the audio at the location of the UWB device.

Figure 7D:
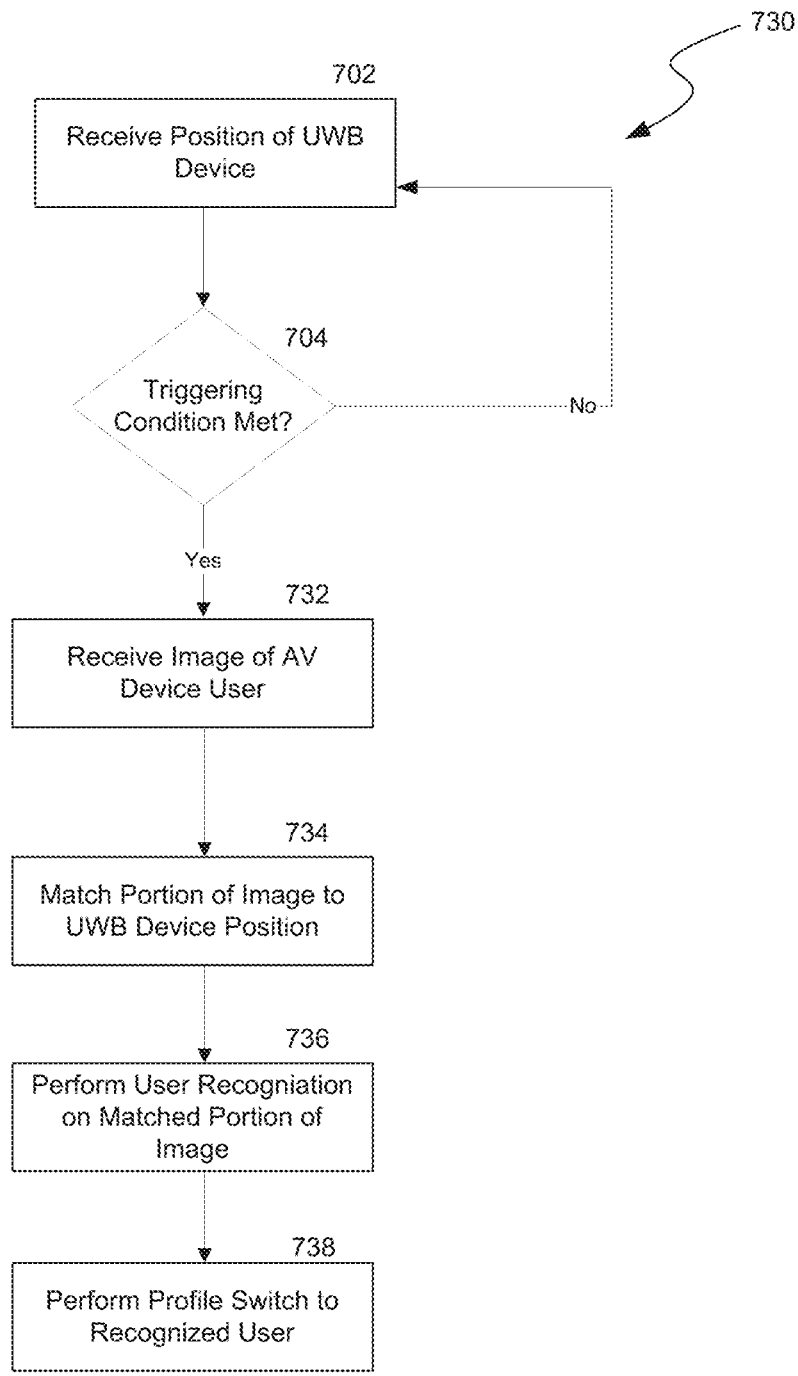
FIG. 7D is a flow diagram illustrating a process used in some implementations for switching an active user profile based on a position of an ultra-wideband remote device.

FIG. 7D is a flow diagram illustrating a process 730 used in some implementations for switching an active user profile based on a position of a UWB remote device (e.g., UWB remote device 250).

The process 730 determines the position of the UWB remote device as in block 702 of FIG. 7A and then may optionally wait for a triggering condition to occur such as in decision block 704 of FIG. 7A.

At block 732 and, where block 704 is performed, in response to the triggering condition occurring, the process 730 receives an image of the user of the smart streaming device, e.g., via a camera connected to the smart streaming device. At block 734, the process 730 matches at least a portion of the image received at block 732 to the position of the UWB remote device determined at block 702. This allows the process 730 to determine which portion of the image corresponds to the UWB device, and thereby which portion of the image is depicting a user holding the UWB device. Process 730 can accomplish this by determining the spatial orientation of the camera, e.g., based on a previous calibration process whereby a user displayed to the camera an object of known dimensions, such spatial relationships can be determined as a comparison to the known dimensions. In some implementations, the camera can include an array of cameras or a depth camera, allowing accurate spatial orientation with or without the calibration process. Process 730 can then determine how that spatial orientation of the camera compares to the position data of the UWB device determined at block 702. For example, process 730 can map the image and the UWB position into a 3D coordinate system to determine how the UWB position relates to the captured image.

At block 736, the process 730 uses one or more facial recognition algorithms, such as machine learning based systems, to perform user recognition on the portion of the image determined at block 734. If the process 730 does not recognize the user, no further action is taken or the current user is notified that they cannot be recognized.

At block 738, the process 730 switches an active profile of the smart streaming device to the user recognized at block 736 as corresponding to the position of the UWB device. When the active profile is switched, the user becomes the active profile on the smart streaming device, which allows the user to access various functions. For example, having the active profile allows the user to access settings associated with the profile, favorite content associated with the profile, preferences associated with the profile, and the like. In some implementations, when the active profile is switched, one or more settings are automatically applied to the smart streaming device, such as automatically increasing or decreasing a brightness of a display of the smart streaming device.

In some implementations, the process 730 can request further log-in information for the identified user. For example, a recognized user can be prompted to enter a security pin or password to log in to the profile of the user. After proper log-in information is received and the user is recognized, the active profile of the smart streaming device is switched.

Figure 7E:
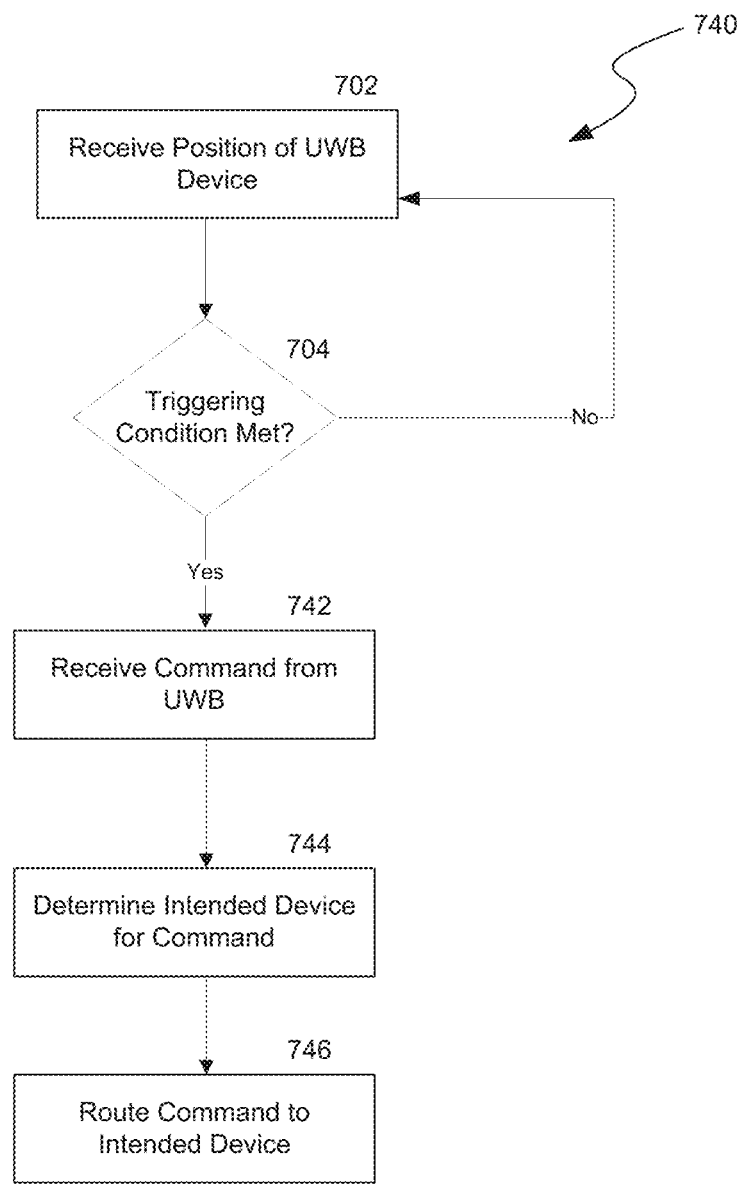
FIG. 7E is a flow diagram illustrating a process used in some implementations for determining an intended device for a command based on a position of an ultra-wideband remote device.

FIG. 7E is a flow diagram illustrating a process 740 used in some implementations for determining an intended device for a command based on a position of a UWB remote device (e.g., UWB remote device 250).

The process 740 determines the position of the UWB remote device as in block 702 of FIG. 7A and then may optionally wait for a triggering condition to occur such as in decision block 704 of FIG. 7A.

At block 742 and, where block 704 is performed, in response to the triggering condition occurring, the process 740 receives a command from the UWB remote device. The command can be routable to multiple devices. For example, certain commands, such as an increase volume, decrease volume, power on/off, etc., can be applicable to more than one device (e.g., a smart streaming device, an associated television the smart streaming device controls, an alternate media player, etc.). The process 740, as described below, can select which device the command is intended for, and then route the command to the intended device.

At block 744, the process 740 determines the intended device for the command based at least partly on the position of the UWB remote device. In some implementations, the process 740 determines that the intended device for the command is the device closest to the UWB remote device (e.g., the device with the shortest distance measurement to the UWB remote device). In other implementations, the process 740 can use both the distance and the angle of arrival to determine if the user is pointing the UWB device at a particular other device. In some implementations, this can be determined with an initial calibration process where a user is instructed to point the UWB device (one or more times from different angles) at each of the devices the UWB device may control. The inputs from this calibration process allow process 740 to map these devices into a 3D space, such that the future position and orientation information gathered at block 702 can be correlated to determine at which of the devices the UWB device is pointed. Alternatively, mathematical transforms can be determined for comparing the positions specified in the calibration process with the current position and direction of the UWB device to determine if they match.

At block 746, the process 740 routes the command to the intended device determined at block 744. In some implementations, after the command is routed to the intended device, the command is executed on the intended device.

Figure 7F:
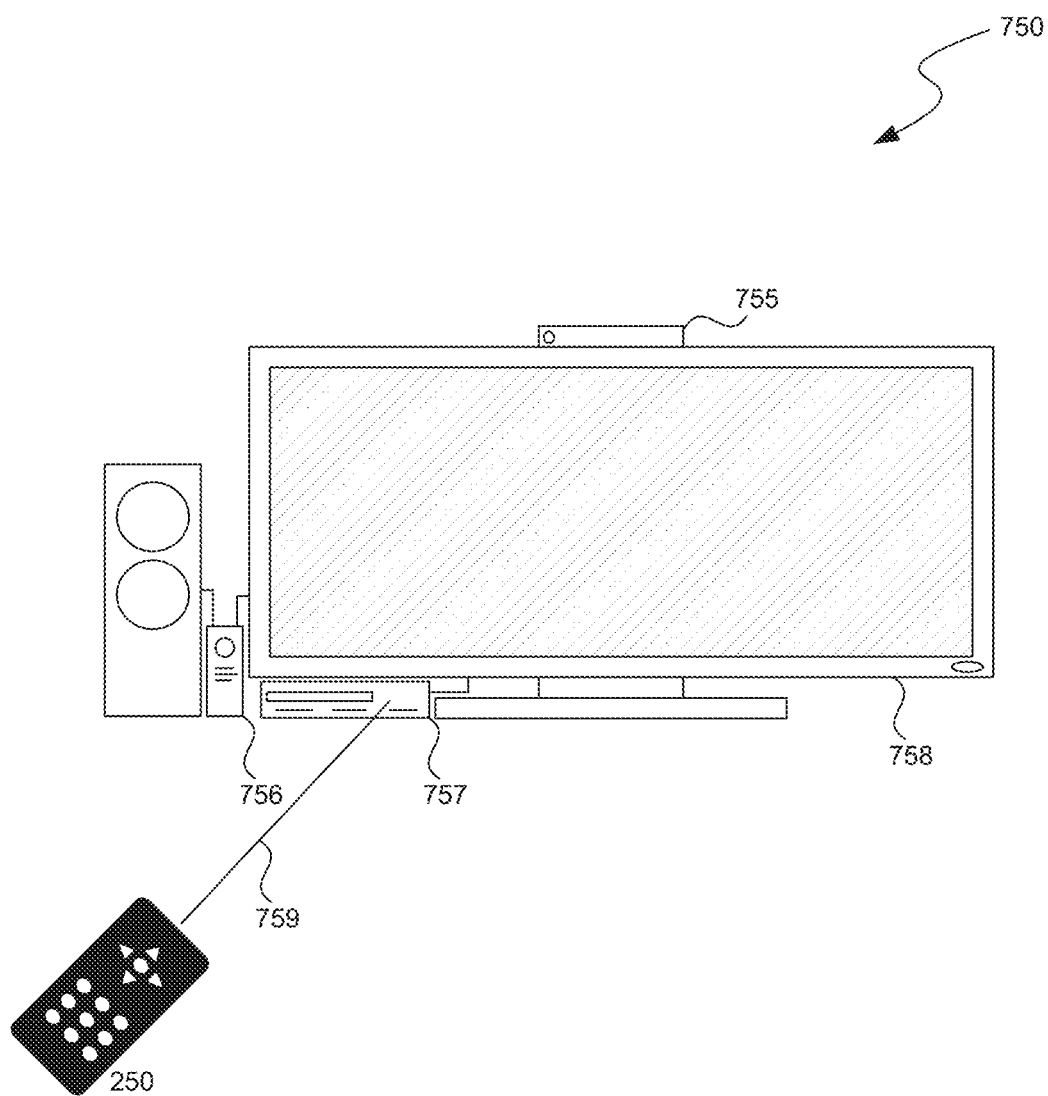
FIG. 7F is a conceptual diagram illustrating a selection of an intended device for a command according to some implementations of the invention.

FIG. 7F is a conceptual diagram 750 illustrating a selection of an intended device for a command according to some implementations of the invention. In the diagram 750, the UWB remote device 250 is in proximity to devices 755, 756, 757, and 758 (referred to as "devices 755-758"). As described above with regards to FIG. 7E, a position of the UWB remote device 250 can be determined by a UWB receiver on one of devices 755-758 (in this case by device 755). From an initial calibration process, the positions of each of the devices 756-758 was determined. The direction 759 of the UWB device 250 is determined and matched to the position of device 757. Device 757 is thus determined as the intended device. A command (in this case a power on command), issued by the UWB remote device 250, is routed to the device 757. In some implementations, the command is communicated to the device 757 via a UWB connection to the intended device 757. In other implementations, the command is received by the device 755 with a UWB receiver and the device 755 forwards the command to the intended device 757 or sends an alternate command to the device 757 causing the command from the UWB device 250 to be implemented by the intended device 757. For example, the device 755 can use a HDMI consumer electronics control (HDMI-CEC) connection to power-on, set input source, etc. for the intended device 757.

Figure 8:
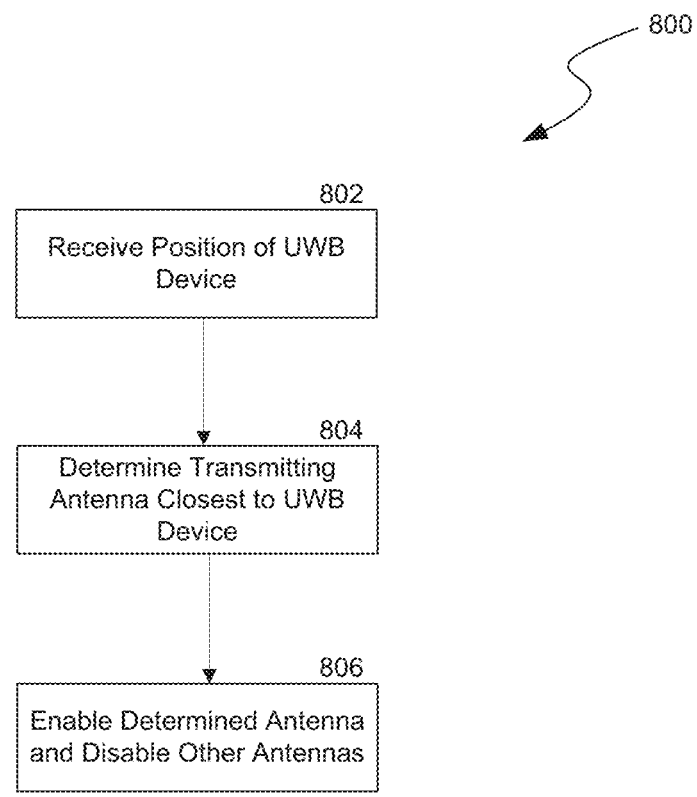
FIG. 8 is a flow diagram illustrating a process used in some implementations for controlling an activation of an antenna of an ultra-wideband remote device.

FIG. 8 is a flow diagram illustrating a process 800 used in some implementations for controlling an activation of an antenna of the UWB remote device (e.g., UWB remote device 250). The UWB remote device communicates with a smart streaming device (such as one of the client computing devices 205). In some implementations, process 800 can be performed "just in time," e.g. as a response to a user input on the UWB remote. In other implementations, the process 800 begins when the UWB remote device is activated, and sits idle or "in the background" until a triggering event, such as the UWB remote coming within a threshold distance of the smart streaming device, occurs. When the triggering event occurs, the process 800 executes.

At block 802, the process 800 determines a position of the UWB remote device. UWB technology allows for the smart streaming device to determine the position of the UWB remote device by determining a distance between the smart streaming device and the UWB remote device and an angle of arrival between the smart streaming device and the UWB remote device. Using the distance and the angle of arrival, a position of the UWB remote device is determined.

At block 804, the process 800 determines a transmitting antenna of the UWB remote device that is closest to the smart streaming device. For example, the UWB remote device can have one more antennas located at various locations within the UWB remote device or on an exterior portion of the UWB remote device. Based on the distance between the UWB remote device and the receiving smart streaming device, the process 800 can determine which of the antennas of the UWB remote device is closest to the receiving smart streaming device. In some implementations, in addition to using the position of the UWB remote device, the process 800 may also use a signal strength between each antenna of the one or more antennas and the receiving smart streaming device to determine which of the antennas is closest to the receiving smart streaming device. In other implementations, the process 800 can use an angle of arrival measurement at the receiving smart streaming device to determine which antenna of the UWB remote device has the shortest line-of-sight to the receiving smart streaming device.

At block 806, the process 800 enables the determined antenna and disables the other antenna(s) on the UWB remote device. Because more than one antenna transmitting at a time may cause interference in communications between the UWB remote device and the receiving smart streaming device, such as a blockage, the closest antenna is determined and used to communicate with the receiving smart streaming device while the other antenna(s) of the UWB remote device are disabled to ensure that a high quality signal is sent to the receiving smart streaming device.

Figure 9:
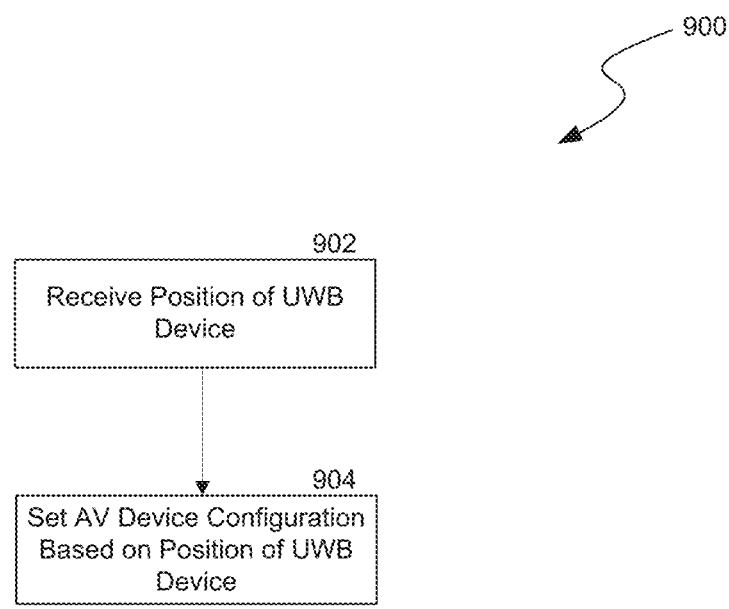
FIG. 9 is a flow diagram illustrating a process used in some implementations for configuring a smart streaming device based on a position of an ultra-wideband remote device.

FIG. 9 is a flow diagram illustrating a process 900 used in some implementations for configuring a smart streaming device based on a position of the UWB remote device (e.g., UWB remote device 250). The UWB remote device communicates with a smart streaming device (such as one of the client computing devices 205). In some implementations, process 900 can be performed "just in time," e.g. as a response to a user input on the UWB remote. In other implementations, the process 900 begins when the smart streaming device is activated, and sits idle or "in the background" until a triggering event, such as the UWB remote coming within a threshold distance of the smart streaming device, occurs. When the triggering event occurs, the process 900 executes.

At block 902, the process 900 determines a position of the UWB remote device. UWB technology allows for the smart streaming device to determine the position of the UWB remote device by determining a distance between the smart streaming device and the UWB remote device and an angle between the smart streaming device and the UWB remote device. Using the distance and the angle, a position of the UWB remote device is determined. In some implementations, the position can be determined as a directed position (e.g., a static position within the room). In other implementations, the position can be determined continuously.

At block 904, the process 900 sets a configuration of the smart streaming device based on the position of the UWB remote device. In one implementation, the process 900 sets the configuration by receiving one or more inputs from the UWB remote device to calibrate the UWB remote device for the smart streaming device. During calibration, determining the position of the UWB remote device allows the process 900 to determine an offset between the position of the smart streaming device and the position of the display, which can be a separate display device connected to the to the smart streaming device.

To calibrate the smart streaming device, a user first moves the UWB remote device to point at a designated point (e.g., the center) of the display, creating a "zero point" as a reference. The user then points the UWB remote device at each corner of the display in turn. During the calibration, the distance, the angle, and the elevation of the position of the UWB remote device is compared to the zero point and/or each of the other corners. Based on the various position measurements, the process 900 can determine a location of the smart streaming device relative to the display, an offset based on the location of the smart streaming device, and a size of the display. Once the offset is determined, the process 900 can use these measurements for accurately receiving and interpreting commands from the UWB remote device. For example, a user of the UWB remote device can point at the display to perform different functions and have a cursor accurately appear on the display (e.g., where the user is intending to point the UWB remote device), even though the smart streaming device is not located at the center of the display.

In another implementation, the smart streaming device may be calibrated to account for drift that can occur when remote movement is based on IMUs measurements of the UWB remote device. To account for this drift, the process 900 periodically determines the angle of the position of the UWB remote device to accurately get the UWB device position, which can then be updated as the user moves the UWB device using further IMU data.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for controlling a smart streaming device, the method comprising:
   determining a position of a transmitter ultra-wideband (UWB) device relative to a group of devices in proximity to the transmitter UWB device,
      wherein the position is determined based on a UWB signal sent from the transmitter UWB device,
      wherein the group includes the smart streaming device and one or more other devices, other than the transmitter UWB device, connected to the smart streaming device, and
      wherein the position A) is based on the UWB signal received from the transmitter UWB device received by a first one of the devices in the group having UWB capability and B) indicates at which device in the group the transmitter UWB device is pointed, and
   based on the position of the transmitter UWB device, performing selective command routing comprising:
      identifying, based on the position, an intended recipient device, other than the first device, from among the group of devices, wherein the intended recipient device is the device at which the transmitter UWB device is pointed,
      selecting, by the first device functioning as an intermediary device other than the transmitter UWB device, a command signal corresponding to i) the intended recipient device and ii) a command initiated from the transmitter UWB device, and
      in response routing, by the intermediary device, the command signal to the intended recipient device.

2. The method of claim 1, wherein the position of the transmitter UWB device is based on a determined angle of arrival of a signal for the transmitter UWB device.

3. The method of claim 1,
   wherein the command indicates to activate or deactivate a device, and wherein the routing of the command signal causes the intended recipient device to activate or deactivate.

4. The method of claim 1, wherein the command indicates to change a volume and wherein the routing of the command signal to the intended recipient device causes the intended recipient device to change its output volume.

5. The method of claim 1, wherein the position of the ultra-wideband device is based on a distance and a determined angle of arrival of the UWB signal for the transmitter UWB device.

6. The method of claim 1, wherein the position of the ultra-wideband device is further based on an initial calibration process to determine positions of each device in the group of devices.

7. A non-transitory computer-readable storage medium storing instructions that, when executed by one or more processors, cause a computing system to execute a process, the process comprising:
   determining a position of a transmitter ultra-wideband (UWB) device relative to a group of devices in proximity to the transmitter UWB device,
      wherein the position is determined based on a UWB signal sent from the transmitter UWB device,
      wherein the group includes the smart streaming device and one or more other devices, other than the transmitter UWB device, connected to the smart streaming device, and
      wherein the position A) is based on the UWB signal received from the transmitter UWB device received by a first one of the devices in the group having UWB capability and B) indicates at which device in the group the transmitter UWB device is pointed, and
   based on the position of the transmitter UWB device, conducting a service event for the smart streaming device, wherein the service event comprises selective command routing comprising:
      identifying, based on the position, an intended recipient device, other than the first device, from among the group of devices, wherein the intended recipient device is the device at which the transmitter UWB device is pointed,
      selecting, by the first device functioning as an intermediary device other than the transmitter UWB device, a command signal corresponding to i) the intended recipient device and ii) a command initiated from the transmitter UWB device, and
      in response routing, by the intermediary device, the command signal to the intended recipient device.

8. The non-transitory computer-readable storage medium of claim 7, wherein the position of the transmitter UWB device is based on a determined angle of arrival of a signal for the transmitter UWB device.

9. The non-transitory computer-readable storage medium of claim 7, wherein the command indicates to activate or deactivate a device, and wherein the routing of the command signal causes the intended recipient device to activate or deactivate.

10. The non-transitory computer-readable storage medium of claim 7, wherein the command indicates to change a volume and wherein the routing of the command signal to the intended recipient device causes the intended recipient device to change its output volume.

11. The non-transitory computer-readable storage medium of claim 7, wherein the position of the ultra-wideband device is based on a distance and a determined angle of arrival of the UWB signal for the transmitter UWB device.

12. The non-transitory computer-readable storage medium of claim 7, wherein the position of the ultra-wideband device is further based on an initial calibration process to determine positions of each device in the group of devices.

13. A computing system for controlling a smart streaming device, the computing system comprising:
   a transmitter ultra-wideband (UWB) device; and
   a smart streaming device, the smart streaming device configured to perform a process, the process comprising:
      determining a position of the transmitter ultra-wideband (UWB) device relative to a group of devices in proximity to the transmitter UWB device,
         wherein the position is determined based on a UWB signal sent from the transmitter UWB device,
         wherein the group includes the smart streaming device and one or more other devices, other than the transmitter UWB device, connected to the smart streaming device, and
         wherein the position is A) based on the UWB signal received from the transmitter UWB device received by a first one of the devices in the group having UWB capability and B) indicates at which device in the group the transmitter UWB device is pointed, and
      based on the position of the transmitter UWB device, conducting a service event for the smart streaming device, wherein the service event comprises
         selective command routing comprising:
            identifying, based on the position, an intended recipient device, other than the first device, from among the group of devices, wherein the intended recipient device is the device at which the transmitter UWB device is pointed,
            selecting, by the first device functioning as an intermediary device other than the transmitter UWB device, a command signal corresponding to i) the intended recipient device and ii) a command initiated from the transmitter UWB device, and
            in response routing, by the intermediary device, the command signal to the intended recipient device.

14. The computing system of claim 13, wherein the position of the transmitter UWB device is based on a determined angle of arrival of a signal for the transmitter UWB device.

15. The computing system of claim 13, wherein the command indicates to activate or deactivate a device, and wherein the routing of the command signal causes the intended recipient device to activate or deactivate.

16. The computing system of claim 13, wherein the command indicates to change a volume and wherein the routing of the command signal to the intended recipient device causes the intended recipient device to change its output volume.

17. The computing system of claim 13, wherein the position of the ultra-wideband device is based on a distance and a determined angle of arrival of the UWB signal for the transmitter UWB device.

18. The computing system of claim 13, wherein the position of the ultra-wideband device is further based on an initial calibration process to determine positions of each device in the group of devices.

* * * * *